(12) United States Patent
Bencze et al.

(10) Patent No.: US 12,500,497 B2
(45) Date of Patent: Dec. 16, 2025

(54) ESP ROTOR ASSEMBLIES CONFIGURED FOR THERMAL EXPANSION COMPENSATION

(71) Applicant: Halliburton Energy Services, Inc., Houston, TX (US)

(72) Inventors: András Bencze, Frimley (GB); Michael Rimmer, Frimley (GB)

(73) Assignee: Halliburton Energy Services, Inc., Houston, TX (US)

( * ) Notice: Subject to any disclaimer, the term of this patent is extended or adjusted under 35 U.S.C. 154(b) by 293 days.

(21) Appl. No.: 18/205,324

(22) Filed: Jun. 2, 2023

(65) Prior Publication Data
US 2024/0405648 A1    Dec. 5, 2024

(51) Int. Cl.
| | |
|---|---|
| *H02K 16/00* | (2006.01) |
| *H02K 5/132* | (2006.01) |
| *H02K 17/16* | (2006.01) |
| *F04D 13/10* | (2006.01) |

(52) U.S. Cl.
CPC .............. *H02K 16/00* (2013.01); *H02K 5/132* (2013.01); *H02K 17/16* (2013.01); *F04D 13/10* (2013.01); *H02K 2213/12* (2013.01)

(58) Field of Classification Search
CPC .......... H02K 5/12; H02K 5/132; H02K 17/16; H02K 17/168; H02K 17/18; H02K 17/20; H02K 16/00; H02K 16/02; F04D 13/086; F04D 13/10
See application file for complete search history.

(56) References Cited

U.S. PATENT DOCUMENTS

| | | | | |
|---|---|---|---|---|
| 2013/0266247 | A1* | 10/2013 | Watson | F04D 13/10 384/276 |
| 2014/0127052 | A1* | 5/2014 | Knapp | H02K 5/1677 417/410.1 |
| 2015/0008780 | A1* | 1/2015 | Reeves | F16C 41/004 310/90 |
| 2015/0123506 | A1* | 5/2015 | Salas Nobrega | H02K 1/274 310/90 |
| 2016/0168913 | A1* | 6/2016 | Hay | E21B 7/067 175/57 |
| 2016/0169231 | A1* | 6/2016 | Michelassi | F04D 13/0693 417/423.12 |

(Continued)

OTHER PUBLICATIONS

Foreign Communication from Priority Application—International Search Report and Written Opinion of the International Searching Authority, International Application PCT/US2023/024524, dated Feb. 27, 2024, 9 pages.

*Primary Examiner* — Oluseye Iwarere
*Assistant Examiner* — Nicholas Lee Setzer
(74) *Attorney, Agent, or Firm* — Conley Rose, P.C.; Rodney B. Carroll

(57) ABSTRACT

Disclosed rotor assemblies can be configured to address differential thermal expansion in the rotor assembly during ESP motor use. Some rotor assembly embodiments can employ an improved stacking technique to minimize differential thermal expansion issues by removing certain components from the axial stack of supporting components of the rotor assembly. Alternatively, or in conjunction, some rotor assembly embodiments can use a biasing element which is configured to compensate for the differential axial thermal expansion, tolerance stack-up, and/or gravity.

20 Claims, 18 Drawing Sheets

(56) References Cited

U.S. PATENT DOCUMENTS

| | | | | |
|---|---|---|---|---|
| 2016/0190893 A1* | 6/2016 | Parmeter | ................ | H02K 5/167 |
| | | | | 310/90 |
| 2017/0098974 A1* | 4/2017 | Clingman | ................ | F04D 13/10 |
| 2017/0264179 A1* | 9/2017 | Khotsyanov | ............ | H02K 5/132 |
| 2018/0038202 A1* | 2/2018 | Williamson | ............. | E21B 47/09 |
| 2019/0162063 A1* | 5/2019 | Brown | .................... | F04D 13/10 |
| 2022/0077732 A1* | 3/2022 | Middleton | .............. | F04D 13/06 |
| 2022/0090603 A1* | 3/2022 | Forsberg | ............... | F04D 13/086 |
| 2024/0405648 A1* | 12/2024 | Bencze | ................. | H02K 16/00 |

* cited by examiner

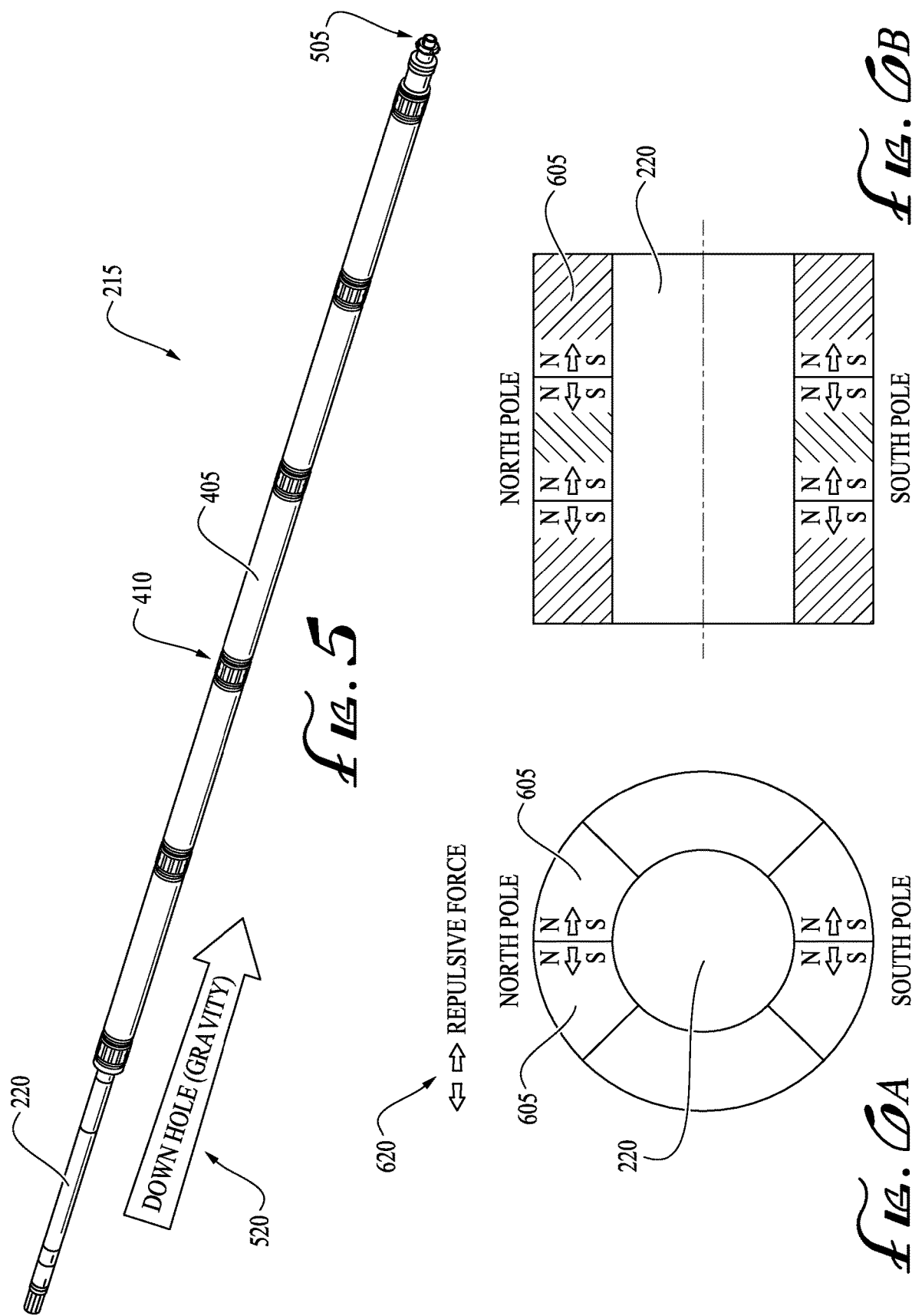

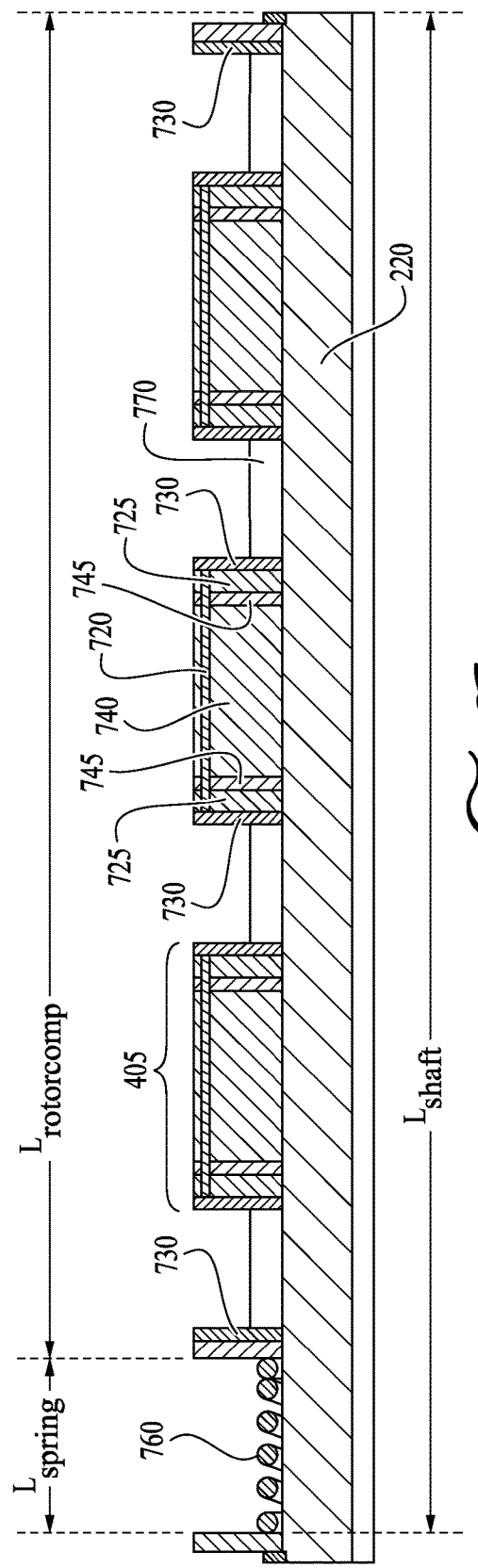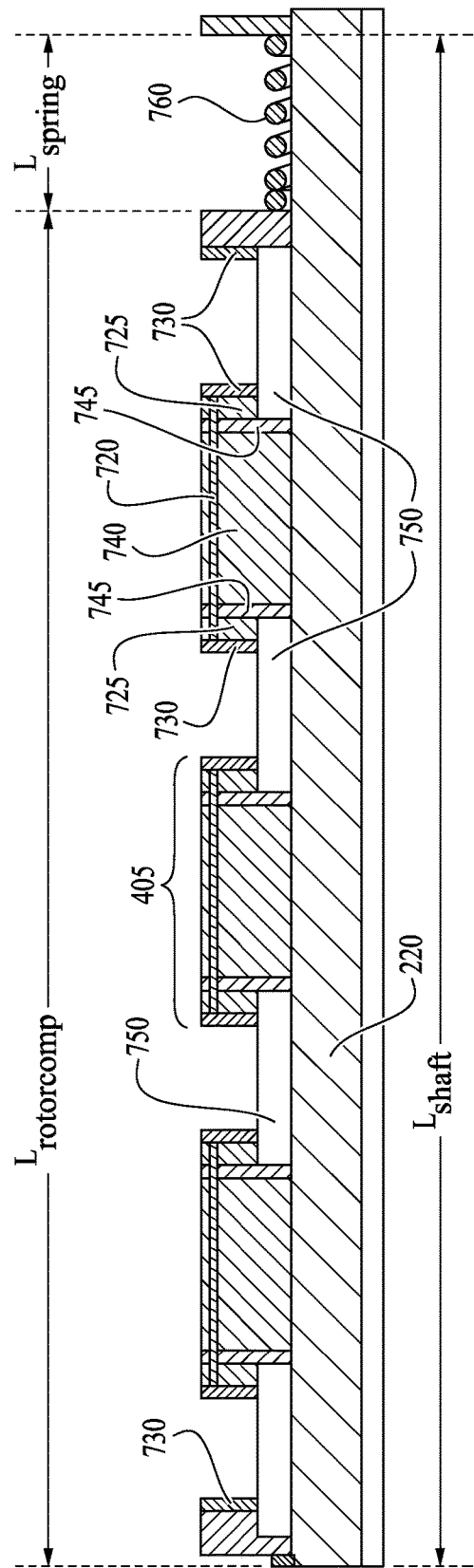

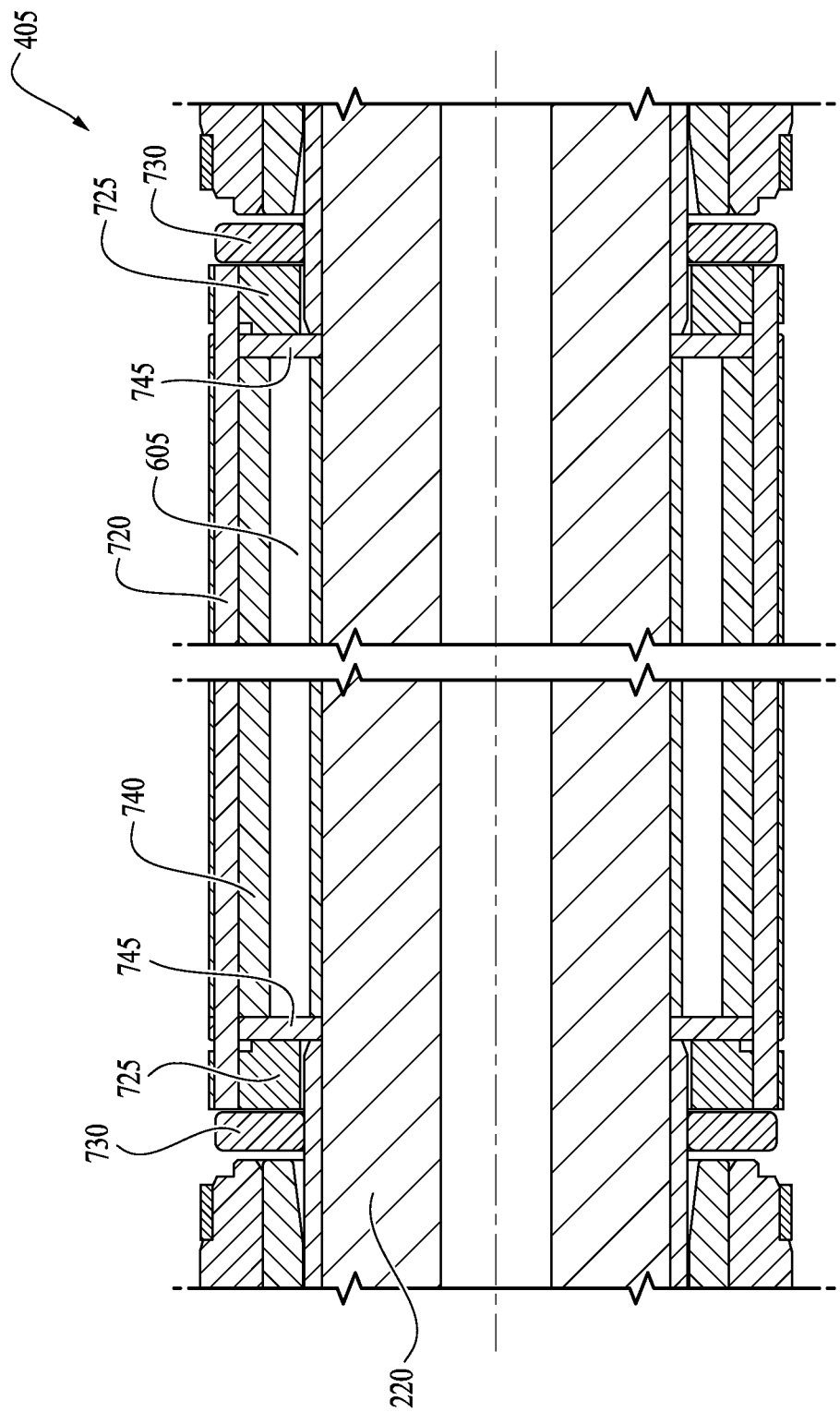

ESP ROTOR ASSEMBLIES CONFIGURED FOR THERMAL EXPANSION COMPENSATION

CROSS-REFERENCE TO RELATED APPLICATIONS

None.

STATEMENT REGARDING FEDERALLY SPONSORED RESEARCH OR DEVELOPMENT

Not applicable.

FIELD

This disclosure relates generally to the field of pumping. More particularly, this disclosure relates to the field of electric submersible pumps for use downhole in a well. Still more particularly, this disclosure relates to downhole motors of the sort which may be used in electric submersible pumps, and to improved rotor assemblies for such downhole motors.

BACKGROUND

Electric submersible pump (ESP) assemblies are used to artificially lift fluid to the surface, for example in deep wells such as oil or water wells. ESP assemblies are commonly used in the oil and gas industry to extract fluids from underground reservoirs. By way of example, the artificial lift provided by ESP assemblies may be useful in situations when the reservoir does not have sufficient energy to allow the well to naturally produce effectively, or when an additional boost to production of the well is desired. Improvements to ESP assemblies can improve overall production of fluids from a well, which may thereby improve the profitability of the well. Improvements in the construction and assembly of the ESP and/or its component parts may result in lower ESP costs and/or in improved characteristics (such as durability or life).

A typical ESP assembly comprises, from bottom to top, an electric motor, a seal unit, a pump intake, and a pump (e.g. typically a centrifugal pump), which are all mechanically connected together with shafts and shaft couplings. The electric motor supplies torque to the shafts, which provides power to the centrifugal pump. The electric motor is isolated from a wellbore environment by a housing and by the seal unit. The seal unit can act as an oil reservoir for the electric motor. The oil can function both as a dielectric fluid and as a lubricant in the electric motor. The seal unit also may provide pressure equalization between the electric motor and the wellbore environment.

The centrifugal pump is configured to transform mechanical torque received from the electric motor via a drive shaft to fluid pressure which can lift fluid up the wellbore. For example, the centrifugal pump typically has rotatable impellers within stationary diffusers. A shaft extending through the centrifugal pump is operatively coupled to the motor, and the impellers of the centrifugal pump are rotationally coupled to the shaft. In use, the motor can rotate the shaft, which in turn can rotate the impellers of the centrifugal pump relative to and within the stationary diffusers, thereby imparting pressure to the fluid within the centrifugal pump. The electric motor is generally connected to a power source located at the surface of the well using a cable and a motor lead extension. The ESP assembly is placed into the well and usually is inside a well casing. In a cased completion, the well casing separates the ESP assembly from the surrounding formation. In operation, perforations in the well casing allow well fluid to enter the well casing and flow to the pump intake for transport to the surface.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 is an isometric view of an exemplary rotor assembly for an ESP motor of an ESP pump assembly, according to an embodiment of the disclosure;

FIG. 6A is radial schematic cross-section view of an exemplary rotor assembly magnet lay-out, according to an embodiment of the disclosure;

FIG. 6B is an axial schematic cross-section view of the magnet lay-out of FIG. 6A, according to an embodiment of the disclosure;

FIG. 7A is schematic axial cross-section view of an exemplary rotor assembly, according to an embodiment of the disclosure;

FIG. 7B is a schematic axial cross-section view of another exemplary rotor assembly, according to an embodiment of the disclosure;

FIG. 9 is an enlarged portion of the axial cross-section view of the rotor assembly of FIG. 8, according to an embodiment of the disclosure;

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, orientation terms "upstream," "downstream," "up," and "down" are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid. "Down" is directed counter to the direction of flow of well fluid, towards the source of well fluid. "Up" is directed in the direction of flow of well fluid, away from the source of well fluid.

Disclosed embodiments relate generally to improved techniques for forming/assembling rotor assemblies. More specifically, disclosed embodiments may relate to rotor assemblies for an ESP motor (e.g. for use with a pump to form an ESP assembly for use downhole in a well to pump formation fluids from the well formation to the surface), with the rotor assemblies being configured to address differential thermal expansion and the related issues arising therefrom.

Figure 1:
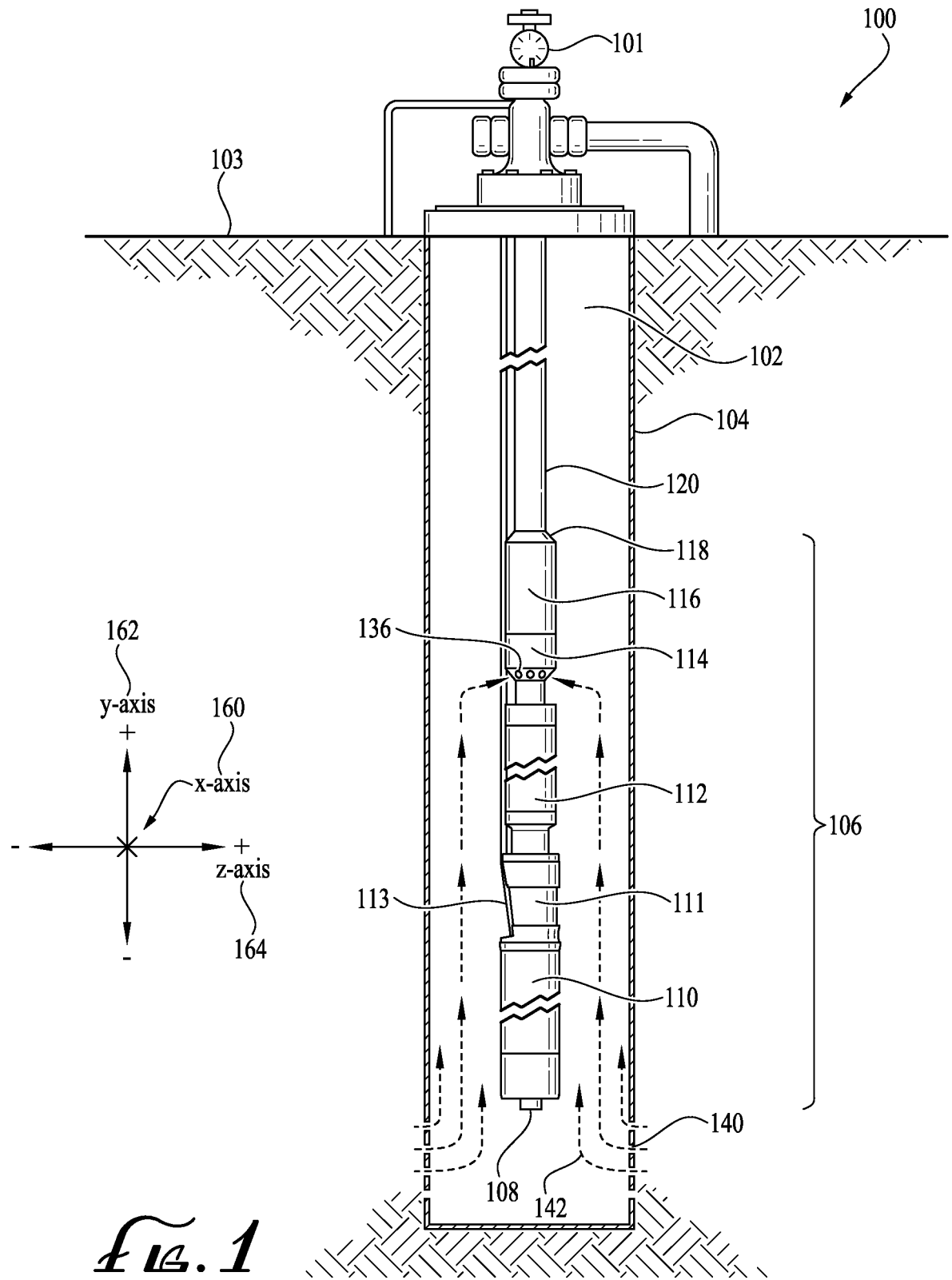
FIG. 1 is a schematic illustration of an exemplary electric submersible pump (ESP) assembly disposed in a wellbore, according to an embodiment of the disclosure.

Turning now to FIG. 1, an exemplary producing well environment 100 is described. In an embodiment, the environment 100 comprises a wellhead 101 above a wellbore 102 located at the surface 103. A casing 104 is provided within the wellbore 102. For convenience of reference, FIG. 1 provides a directional reference comprising three coordinate axes—an X-axis 160 where positive displacements along the X-axis 160 are directed into the sheet and negative displacements along the X-axis 160 are directed out of the sheet; a Y-axis 162 where positive displacements along the Y-axis 162 are directed upwards on the sheet and negative displacements along the Y-axis 162 are directed downwards on the sheet; and a Z-axis 164 where positive displacements along the Z-axis 164 are directed rightwards on the sheet and negative displacements along the Z-axis 164 are directed leftwards on the sheet. In the embodiment of FIG. 1, the Y-axis 162 is approximately parallel to a central axis of a vertical portion of the wellbore 102.

An exemplary electric submersible pump (ESP) assembly 106 is deployed downhole in a well within the casing 104 and comprises an optional sensor unit 108, an electric motor 110 which may include a motor head 111, a seal unit 112, an electric power cable 113, a pump intake 114, a centrifugal pump 116, and a pump outlet 118 that couples the centrifugal pump 116 to a production tubing 120. The centrifugal pump 116 is operatively coupled to the motor 110 by a shaft (not shown). In an embodiment, the ESP assembly 106 may employ thrust bearings in several places, for example in the electric motor 110, in the seal unit 112, and/or in the centrifugal pump 116. While not shown in FIG. 1, in an embodiment, the ESP assembly 106 can comprise a gas separator that may employ one or more thrust bearings. The motor head 111 couples the electric motor 110 to the seal unit 112. The electric power cable 113 may connect to a source of electric power at the surface 103 and to the electric motor 110, for example being configured to provide power from the source of electric power at the surface 103 to the electric motor 110.

In operation, the casing 104 is pierced by perforations 140, and reservoir fluid 142 flows through the perforations 140 into the wellbore 102. The fluid 142 flows downstream in an annulus formed between the casing 104 and the ESP assembly 106, is drawn into the pump intake 114, is pumped by the centrifugal pump 116, and is lifted through the production tubing 120 to the wellhead 101 to be produced at the surface 103. The fluid 142 may comprise hydrocarbons such as oil and/or gas, water, or both hydrocarbons and water.

While the example illustrated in FIG. 1 relates to land-based subterranean wells, similar ESP systems can be used in a subsea environment and/or may be used in subterranean environments located on offshore platforms, drill ships, semi-submersibles, drilling barges, etc. And while the wellbore is shown in FIG. 1 as being approximately vertical, in other embodiments, the wellbore may be horizontal, deviated, or any other type of well. Also, while the pump of the ESP is described with respect to FIG. 1 as a centrifugal pump, other types of pumps (such as a rod pump, a progressive cavity pump, any other type of pump suitable for the system, or combinations thereof) may be used instead.

Figure 2:
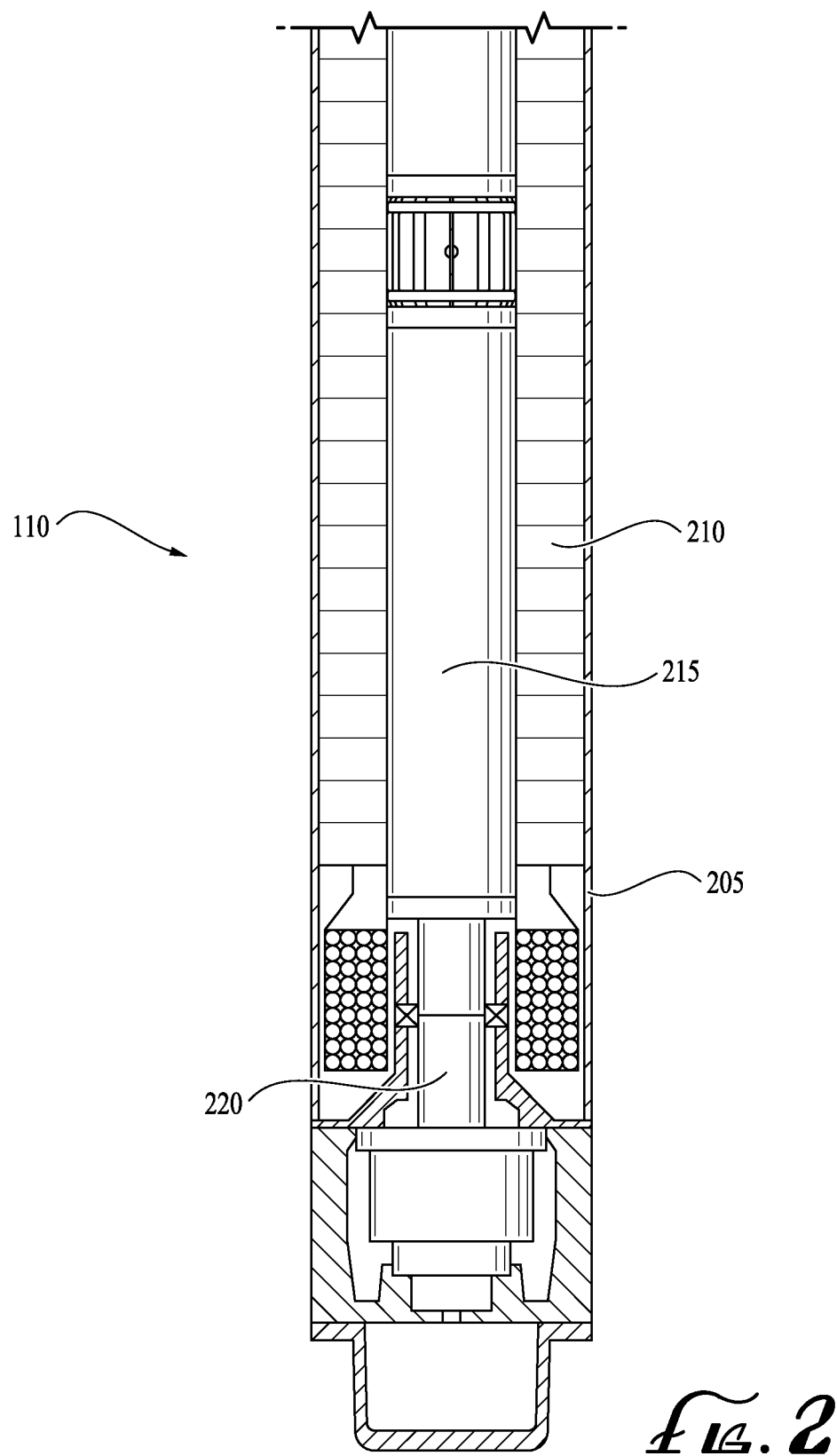
FIG. 2 is a cross-sectional view of an exemplary motor for the electric submersible pump assembly of FIG. 1, according to an embodiment.
Figure 3:
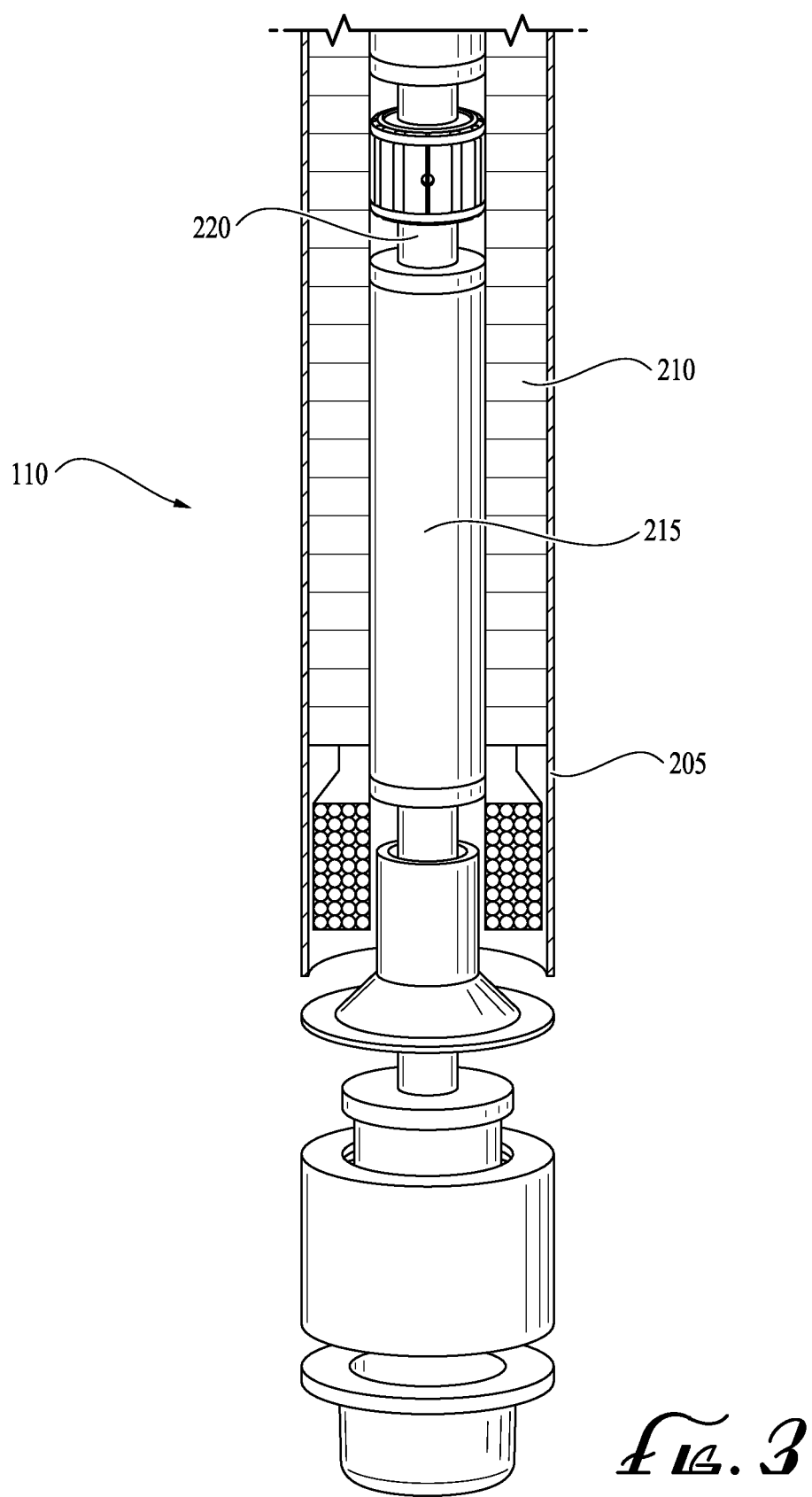
FIG. 3 is an exploded isometric view of the motor of FIG. 2, according to an embodiment of the disclosure.

As shown in FIGS. 2-3, an exemplary motor 110 of the ESP assembly includes a housing 205, a stator 210, a rotor 215, and a drive shaft 220. The housing 205 typically comprises a hollow cylinder or tube and is configured to protect the internal components of the motor 110 from the external environment. The stator 210 also typically comprises a hollow cylinder and is secured to the housing 205 (e.g. to the inner surface of the housing 205) so as to be stationary within the housing 205. Typically, the stator 210 comprises a plurality of laminations, which may be thin sheets of steel, iron, or bronze, wrapped by a plurality of electrically conductive windings. When energized, the windings generate a rotating magnetic field for interaction with the rotor 215 to induce rotation of the rotor 215. The rotor 215 also typically comprises a hollow cylinder and is concentrically arranged between the stator 210 and the drive shaft 220, for example with the drive shaft 220 typically extending longitudinally along the centerline of the motor 110, the rotor 215 disposed around the drive shaft 220, and the stator 210 disposed around the rotor 215, within the housing 205. The rotor 215 is rotatable within the stator 210 and secured to the drive shaft 220, such that rotation of the rotor 215 drives the drive shaft 220. In embodiments, the motor 110 may be a two or more pole motor, a three-phase squirrel cage induction motor, a permanent magnet motor (PMM), or other motor configuration.

Figure 4:
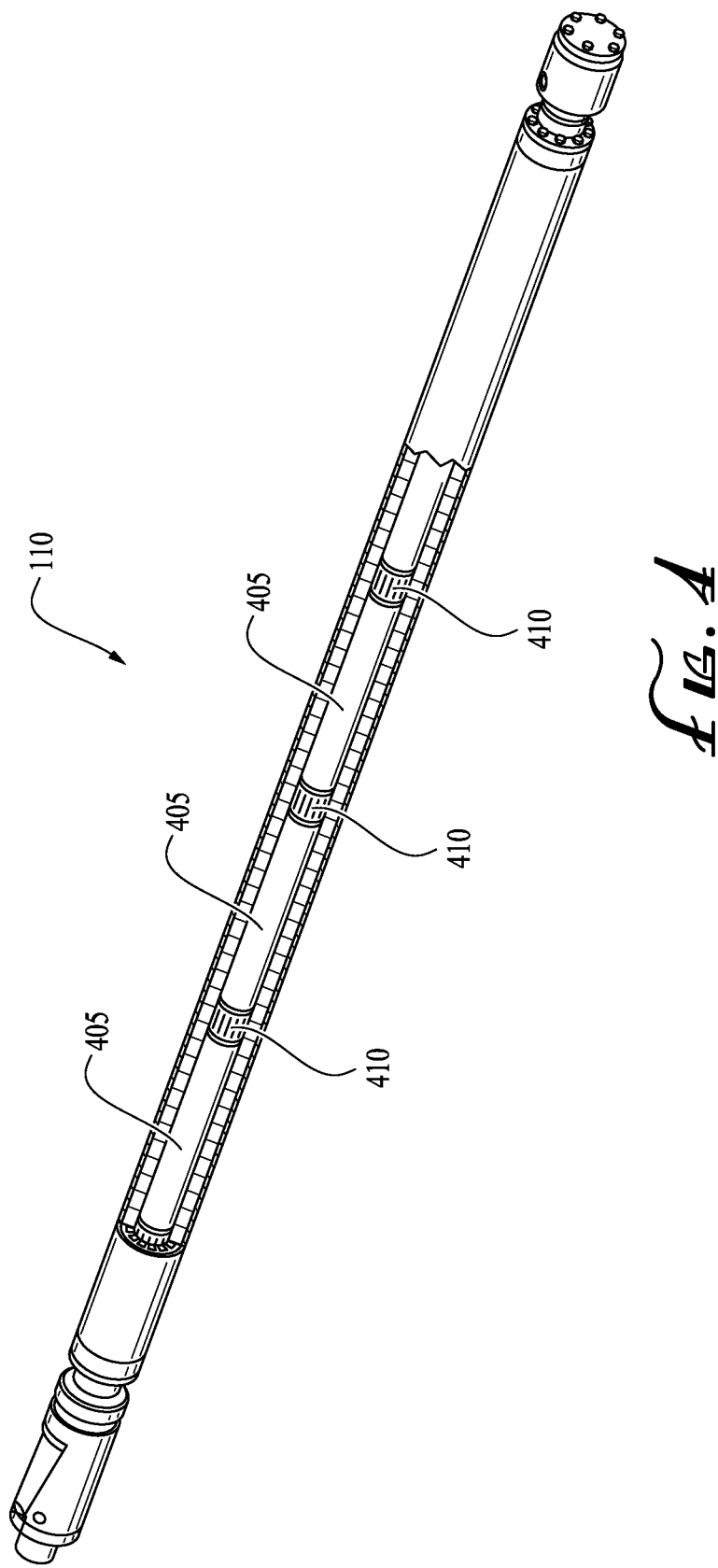
FIG. 4 is a partial cut-away isometric view of an exemplary ESP motor having a plurality of rotor modules with rotor bearing assemblies therebetween, according to an embodiment of the disclosure.

Depending on the power requirements of the motor 110, the rotor 215 can be an assembly which typically includes a number of rotor modules, which together jointly form the rotor assembly 215, with each rotor module secured to the drive shaft 220. The rotational magnetic field of the stator 210 when energized can induce rotation of the rotor 215, and thereby the drive shaft 220, with the drive shaft 220 transmitting rotational torque from the motor 110 to the pump 116. As shown in FIG. 4, the rotor modules 405 (jointly forming the rotor 215) are spaced apart from each other along the drive shaft 220, with a rotor bearing assembly 410 typically located between adjacent rotor modules 405. Rotor bearing assemblies 410 can also be located at the top of the uppermost rotor module 405 and/or the bottom of the lowermost rotor module 405 (e.g. at the top and bottom of the rotor). In some embodiments, the rotor bearing assembly 410 can be a hydrodynamic bearing assembly. Each rotor bearing assembly 410 is configured to support the rotor 215 at predefined axial positions to maintain correct radial alignment of the drive shaft 220 during motor operation.

As discussed in more detail below with respect to specific embodiments, rotor bearing assemblies 410 can comprise a journal sleeve and a bearing bushing assembly. The journal sleeve is configured to be concentrically disposed around and secured to the drive shaft 220 to rotate with the drive shaft 220. In embodiments, the inner journal sleeves can be configured to space each rotor module 405 evenly on the drive shaft 220. The outer bearing bushing assembly is concentrically located around the inner journal sleeve, and the bearing bushing assembly fixedly engages into the stator lamination (e.g. the bearing bushing assembly is configured to engage the inner surface of the stator 210 to prevent rotation therein). The engagement into the stator lamination is required to ensure that the bearing bushing assembly does not spin during operation, but instead provides a stationary surface within which the inner journal sleeve can rotate, to produce hydrodynamic lubricating film.

During start-up and in operation, the rotor 215 is heated, for example due to friction, and thereby expands radially and axially. Since materials with different coefficient of thermal expansion (CTE) may be used in rotor construction, the components of the rotor 215 (e.g. with different CTE) can expand at different rates. Further, the expansion between the drive shaft 220 and one or more of the components of the rotor 215 can vary. To compensate for the differential axial thermal expansion, the rotor modules 405 may not be constrained at one end of the shaft, for example allowing axial thermal expansion in one direction, while the shaft may grow/expand less.

A snap ring or similar end support structure can be installed at one end of the shaft to support the mass of the rotor assembly 215 components (e.g. with respect to gravity). The mass of each rotor module 405 can be transferred to the next (e.g. lower) rotor module 405 (e.g. through the bearing assemblies 410 disposed between adjacent rotor modules 405). The components of the last (e.g. lowest/bottom) rotor module 405, such as the last thrust washer, may be subjected to the weight of all components above. The strength of this polymeric thrust washer, for example, could be the limiting factor for the number of rotor modules 405 that can be used in a rotor assembly 215.

Another snap ring can be installed at the opposite end of the shaft 220, at a pre-defined distance from the first/uppermost rotor module 405 to ensure that there is enough expansion length (e.g. for thermal expansion). The rotor modules 405 can be (axially) loose on the shaft 220, and they can be operable to shift axially during installation into the stator 210 and/or during operation of the motor 110. The stator 210 may require allowance for the rotor 215 thermal growth, to ensure that the rotor end bearings cannot extend out from its support in the stator lamination stack. In motors with a long shaft and many rotor modules, this allowance could increase cost and can impact the manufacturability.

While some embodiments may simply use sufficient length to allow for this type of thermal expansion (e.g. as discussed above), alternative methods can further improve thermal expansion compensation methods in electric motors of ESPs. Implementing such improved solutions may reduce material and machining costs, both on the stator and rotor assemblies. It also may provide the ability to utilize materials with considerable variation in CTE for the rotor assembly 215 components (i.e. a combination of metallic, polymeric, ceramic construction), thus making the rotor assembly 215 construction feasible for both low and elevated temperature applications, with minimal design changes. Further, it can have a substantial impact in the construction of permanent magnet motor (PMM) rotor assemblies, where permanent magnets are used.

By way of non-exclusive example, the disclosure presents embodiments for improved thermally compliant axial retention systems, which may deal simultaneously with thermal growth variances, tolerance stack up effects, and/or provide retaining load. To minimize the thermal growth element of embodiments, a rotor 215 design can be employed to remove the majority of effect of the dissimilar material parts from the axial retention system chain, for example largely leaving a similar class of materials (such as steel) to carry the required axial force. Further, spring elements can be implemented to support the weight of the rotor modules and/or to provide a method of compensating for thermal growth. For example, these springs can be mounted at the base end of the shaft 220 to support the mass of the entire rotor module assembly 215, or they can be installed at each rotor module 405 (or at a grouping of two or more rotor modules 405) for larger diameter motors with heavier rotor modules.

Turning now to the figures in detail for more specific examples, FIG. 5 illustrates a typical rotor assembly 215 of an electric motor 110 (for example, of an ESP assembly). In embodiments, the electric motor 110 can be a permanent magnet motor. Typically, the rotor assemblies 215 shown in the figures belong to such a permanent magnet motor (PMM). However, alternate embodiments may include an electric motor of any conventional type, i.e. an induction motor or a hybrid PMM containing elements of both permanent magnet and induction motors. The rotor assembly 215 of the PMM utilizes permanent magnets to generate the electromagnetic field, compared to induction motors where the magnetic field is generated by inducing a current in rotor interconnected bars made from copper. Persons of skill should appreciate that the proposed methods of stacking and/or pre-compressing the rotor modules 405 can be equally applicable for both types of rotor assemblies 215.

In the case of permanent magnet motors, the length of the magnet 605 in the rotor module 405 may be significantly longer than the typical maximum manufactured size of the magnet. Accordingly, the magnet 605 can be subdivided into smaller sections as shown in FIGS. 6A-B. This subdivision can be both in the circumferential and in the axial directions. All the magnets 605 are assembled in the same polar direction (North or South); therefore, the sides of the individual magnets 605 have the same polarity, in both the circumferential and axial directions. As the same poles repel each other, a repulsive force 620 can be created, both circumferentially and axially.

This force 620 can be a function of the magnet side area, the strength of magnet used, and the magnet length, and may produce significant force. In the circumferential direction the force 620 can be controlled by a mechanical circumferential stop (e.g. the side of the pockets in the lamination). In the axial direction the pockets are open and so an additional component may be required to stop the magnets 605 from sliding out of the pocket. While it may be possible to bond the magnets 605 together and into the pocket, a mechanical solution may be preferred, as the bonding method is typically used as a manufacturing aid and the bonding agents can become unreliable during operation (e.g. particularly in cases where the operating temperature is high). The cage bars of the rotor modules 405 can typically have a thermal expansion coefficient (e.g. CTE) higher than the rotor module laminations. For example, the cage bars may be formed of copper, while the laminations may be formed of steel. Similarly, magnets 605 can have a lower thermal expansion coefficient (e.g. CTE) than the rotor module laminations. When the rotor assembly 215 is heated, the cage bars may increase in length by more than the lamination stack. This can cause the cage end rings (e.g. which may also be formed of copper and/or which can be attached to the cage bars) to separate from the end faces of the lamination of the rotor modules. In this scenario, the magnets 605 may no longer be mechanically held, and the magnets 605 can potentially slide in the pockets and separate under the action of magnetic repulsion forces.

A rotor assembly 215 embodiment can comprise a single drive shaft 220, a plurality of magnetic rotor modules 405, and a plurality of radial hydrodynamic bearing assemblies 410. Typically, a bearing assembly 410 can be disposed between adjacent rotor modules 405. In embodiments, the rotor assembly 215 can also include a pre-loading mechanism 505 (as shown in FIG. 5), which can provide thermal expansion compensation for the rotor assembly 215. In the embodiment shown in FIG. 5, the pre-loading mechanism 505 is disposed at the non-drive end (e.g. the motor base) of the rotor assembly 215, and it can be configured to act against the gravitational load 520 created by all the rotor modules 405 and journal bearing assemblies 410 installed on the shaft 220 (as well as addressing differential thermal expansion, for example). Alternatively, or in conjunction, the pre-loading mechanism 505 can be positioned at the drive end (e.g. the motor head) of the shaft 220, according to other embodiments.

FIGS. 7A and 7B illustrate schematically alternate stacking embodiment options for components of a rotor assembly 215. In the embodiment of FIG. 7A, a journal sleeve 770 of a bearing assembly 410 is installed between each adjacent pair of rotor modules 405. The journal sleeve 770 may be installed directly onto the drive shaft 220 (e.g. concentric with the drive shaft 220) and may axially contact any adjacent rotor modules 405 (which are also concentrically disposed on the drive shaft 220). This method of stacking the rotor modules 405 and journal sleeves 770 onto the shaft 220 may have all rotor module 405 components compressed between two adjacent journal sleeves 770 located on both sides of the rotor module 405. The thermal expansion of the rotor 215 may then be affected by the thermal expansion of each component of an individual rotor module 405. In this configuration, the rotor bars 720, the cage rings 725, and the thrust washers 730, due to their typically higher thermal expansion coefficient (e.g. CTE), can contribute the most to the overall thermal expansion of the rotor assembly 215, since all of those components may receive and transmit axial force.

An alternate stacking method is shown in FIG. 7B, which is designed to reduce thermal expansion of the rotor modules 405 by moving components/elements of the rotor modules 405 with higher CTE out of an axial stack of supporting components of the rotor assembly, so that they do not significantly impact the thermal expansion of the rotor module 405 as a whole. For example, the cage rings 725, rotor bars 720, and the thrust washers 730 can be disconnected from (e.g. moved out of) the axial stack of supporting components of the rotor assembly, thus reducing the effect of thermal expansion on the rotor assembly 215. Each rotor module 405 (e.g. comprised here with respect to axial force transmission of only the lamination stack 740 and the end laminations 745, both made from steel) can be spaced by a steel support sleeve 750 (as will be discussed in more detail below with respect to specific embodiments), which may minimize the effect of differential axial thermal expansion between the rotor module components and the shaft 220. While the support sleeve 750 may be steel in some embodiments, in other embodiments, the support sleeve can be formed of other materials with CTE similar to that of the lamination stack 740, end laminations 745, and/or drive shaft 220.

There can be significant impact by reconfiguring the rotor assembly (e.g. stacking the components) in the manner of FIG. 7B as opposed to FIG. 7A. For example, assuming there would be a spring pre-compression in both cases, the thermal expansion calculation shows that the spring 760 would typically compress by about 35% in case of the stacking method of FIG. 7A vs. about 4% in case of the spacer sleeve stacking method of FIG. 7B. So, while spring pre-compression is possible for both stacking methods, the amount of spring compression may be significantly less using the rotor assembly component stacking method of FIG. 7B. Careful consideration can be used when selecting the spring, since an inadequate spring could lead to the spring reaching its solid height, which could render the spring unusable and could lead to shaft bowing.

Figure 8:
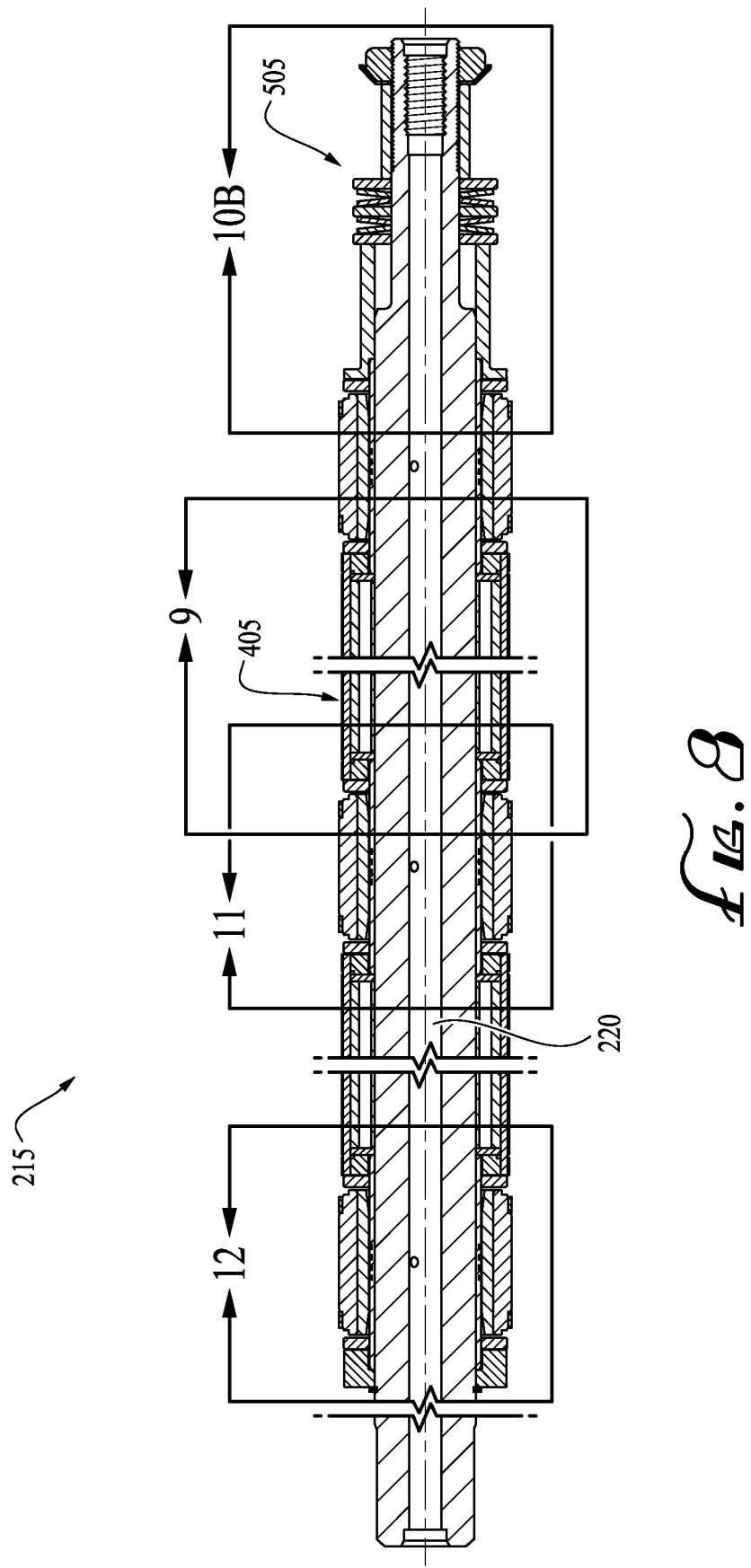
FIG. 8 is an axial cross-section view of yet another exemplary rotor assembly, according to an embodiment of the disclosure.
Figure 11:
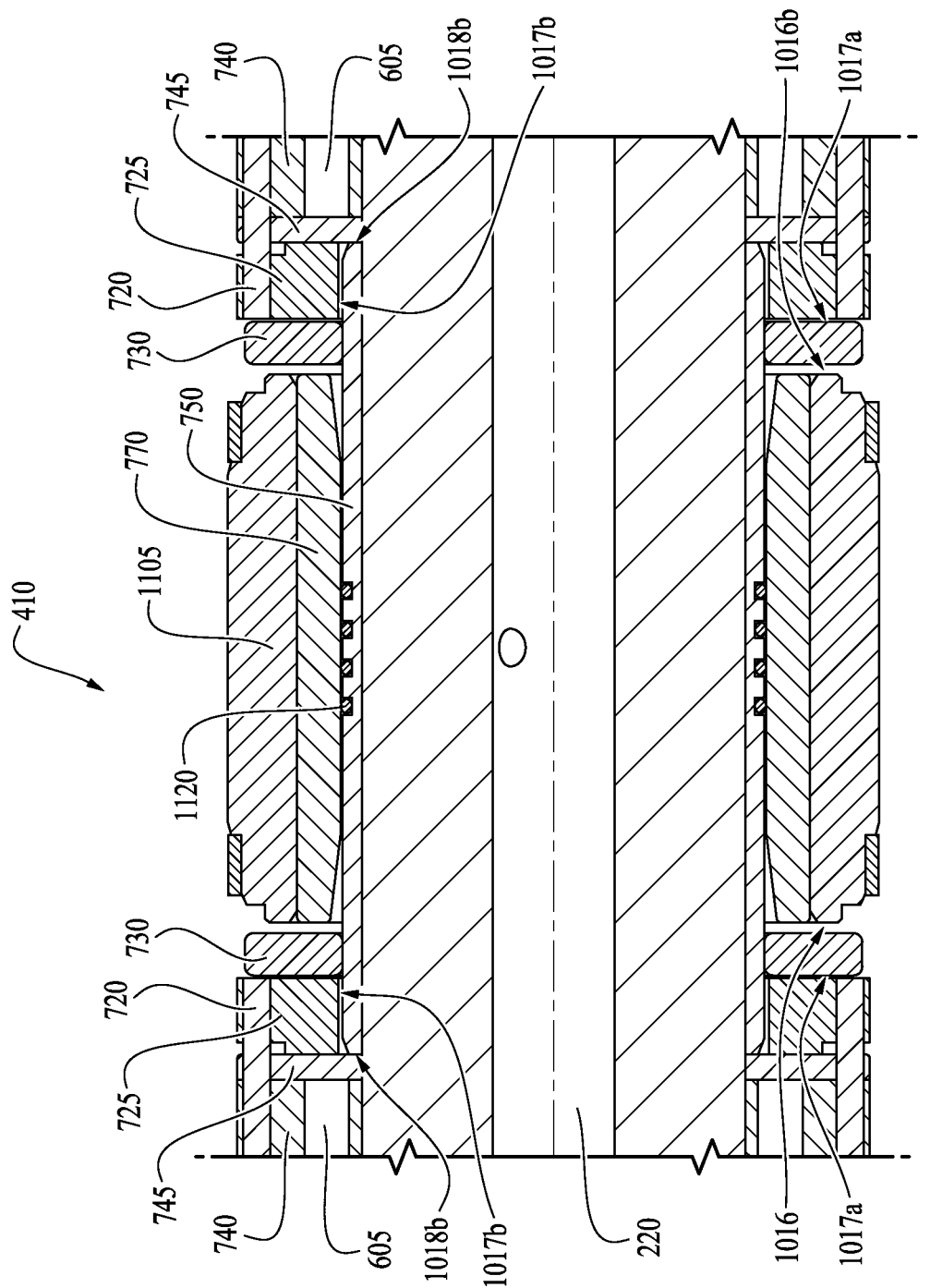
FIG. 11 is an enlarged portion of the axial cross-section view of the rotor assembly of FIG. 8, showing the journal bearing assembly between two adjacent rotor modules, according to an embodiment of the disclosure.
Figure 12:
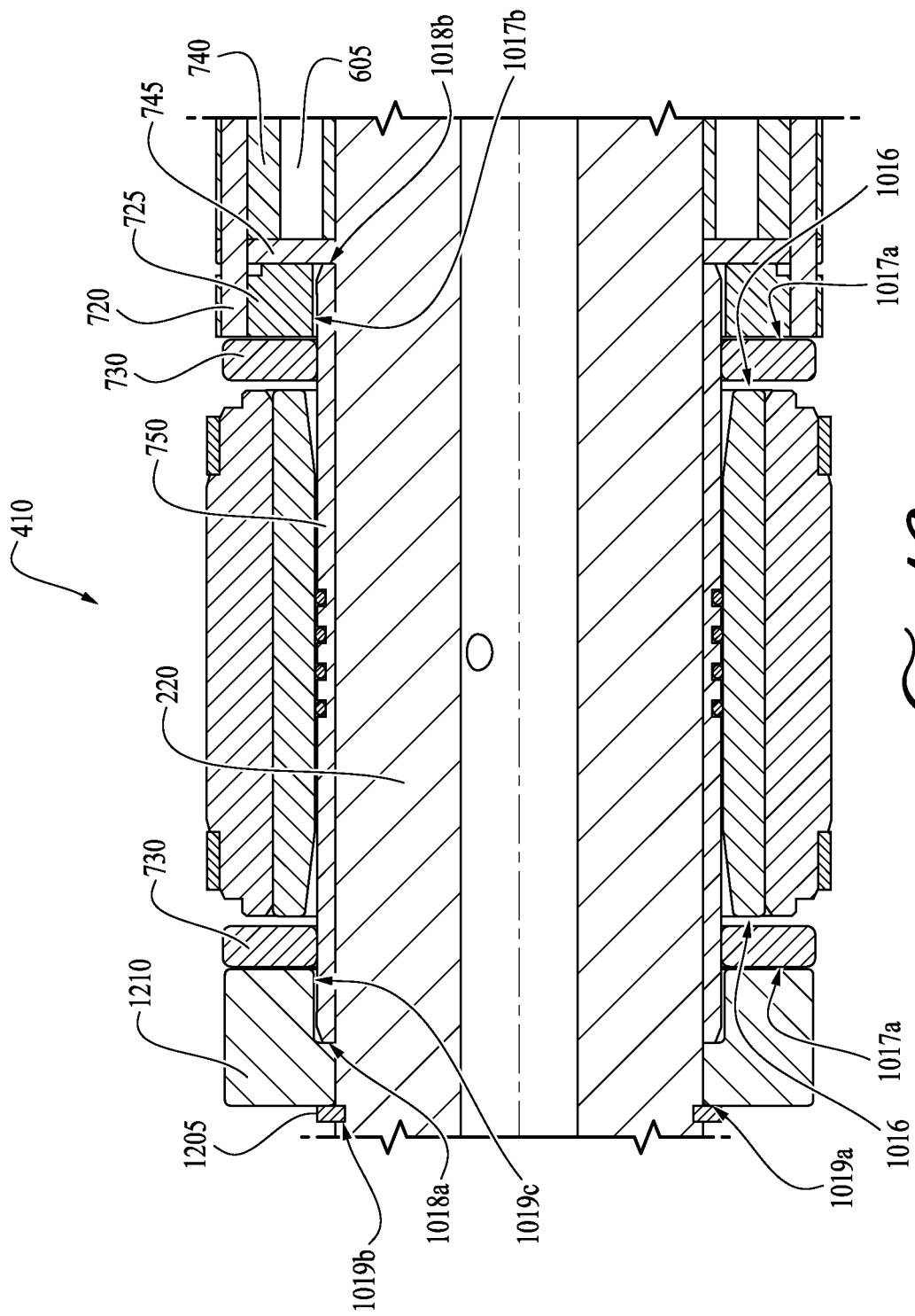
FIG. 12 is an enlarged portion of the axial cross-section view of the rotor assembly of FIG. 8, showing the journal bearing assembly at the motor head end of the shaft, according to an embodiment of the disclosure.

The approach illustrated schematically in FIG. 7B will now be discussed in more detail with respect to specific rotor assembly 215 embodiments. A longitudinal cross-section of an exemplary rotor assembly 215 embodiment is depicted in FIG. 8, showing the overall rotor assembly 215 construction. FIG. 9, FIGS. 10A-B, FIG. 11, and FIG. 12 illustrate in more detail portions of the rotor assembly 215 of FIG. 8. For example, FIG. 9 illustrates an exemplary rotor module 405, illustrating interaction with other components based on the proposed stacking method shown in FIG. 8. FIG. 10B illustrates an exemplary pre-loading mechanism 505 at the non-drive end of the shaft 220 (e.g. at the motor base). FIG. 11 focuses on the proposed stacking method (e.g. using the support sleeve 750) which can be used between any two adjacent magnetic rotor modules 405 on the shaft 220. FIG. 12 focuses on the retention and stacking method at the drive end (e.g. at the motor head) of the shaft 220.

The magnetic rotor module 405 shown in FIG. 9 typically includes the lamination stack 740, the end laminations 745, the plurality of cage bars 720, and the plurality of cage rings 725. The lamination stack 740, plurality of cage bars 720 as a whole, and each cage ring 725 may be concentrically disposed about the drive shaft 220. The lamination stack 740 can be made from a plurality of stamped thin sheets of electrical steel, which may be assembled together by bonding, by clinching, or by use of interference fit to another component (e.g. the drive shaft 220). In embodiments, the lamination stack 740 can include the desired geometry (e.g. pockets) to accept a plurality of permanent magnets 605, which may be made from rare earth such as Samarium Cobalt or Neodymium Iron Boron. The end laminations 745 can be disposed on each end of the lamination stack 740, for example to trap the magnets in the lamination stack pockets. The end laminations 745 may be thicker steel than the lamination stack 740. The plurality of electrically conductive (e.g. copper) cage bars 720 can be installed inside a plurality of longitudinally extending holes in the lamination stack 740 (e.g. with the longitudinally extending holes disposed around the drive shaft 220), and may protrude from each end of the lamination stack 740. The electrically conductive (e.g. brass) cage rings 725, can be disposed on each end of the lamination stack 740, for example connected to the plurality of cage bars 720 by interference fit or soldering to create a squirrel cage (e.g. similar to an induction motor). In other embodiments, the permanent magnets 605 can be omitted, making the rotor module 405 a standard induction rotor module. In embodiments, the lamination stack 740 and/or end laminations 745 may have CTE similar to the drive shaft 220 (e.g. within approximately +/−25%, or alternatively approximately +/−20% or approximately +/−15% in other embodiments). In embodiments, electrically conductive components of the rotor modules 405 (e.g. the cage rings 725 and/or cage bars 720) may have a CTE which is dissimilar (e.g. more than approximately +25%, or alternatively approximately +/−30% or approximately +/−40% in other embodiments) to that of the lamination stack 740, end laminations 745, and/or drive shaft 220.

Figure 10A:
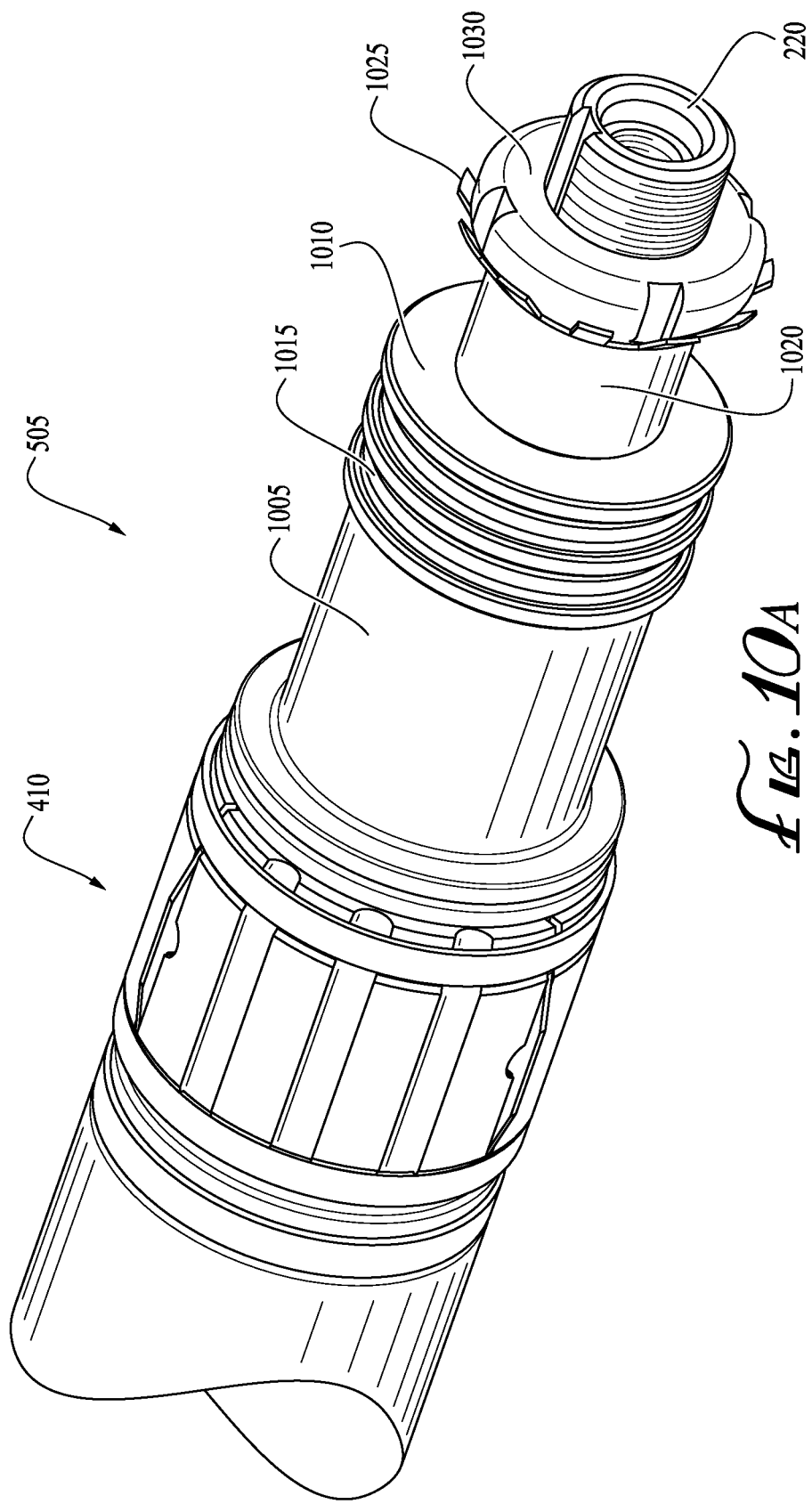
FIG. 10A is a partial isometric view of an exemplary end of the rotor assembly of FIG. 8, according to an embodiment of the disclosure.
Figure 10B:
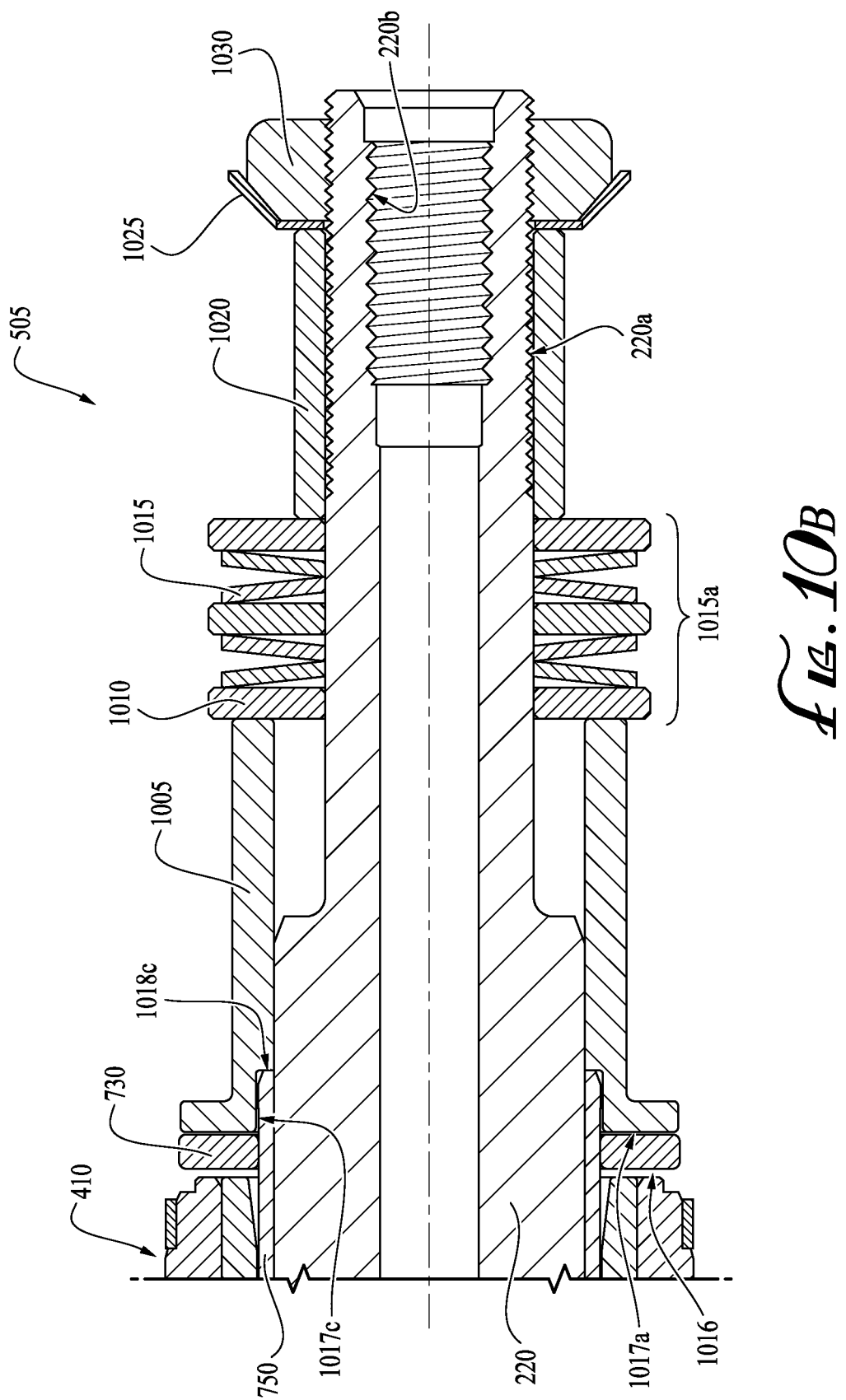
FIG. 10B is an enlarged portion of the axial cross-section view of the rotor assembly of FIG. 8, corresponding to FIG. 10A, according to an embodiment of the disclosure.

The exemplary pre-loading mechanism 505 depicted in FIGS. 10A-B comprises: the rotor preload sleeve 1005, a plurality of rotor preload washers 1010, a plurality of disc springs 1015, a stand-off sleeve 1020, a tab lock washer 1025, and a lock nut 1030. The longitudinal cross-section through the preload mechanism in FIG. 10B illustrates in more detail the arrangement of the components according to this embodiment. The support sleeve 750 typically can provide the spacing between each magnetic rotor module 405, as well as the spacing between the last (e.g. lowermost) magnetic rotor module 405 on the non-drive end of the shaft 220 and the rotor preload sleeve 1005. One educated in the art could find alternated pre-loading and locking arrangements, and this is a mere illustration of one possible solution.

In the embodiment of FIG. 10B, the preload sleeve 1005 slides over the shaft 220 concentrically with the steel support sleeve 750, with a radial clearance 1017c around the steel support sleeve 750. The preload sleeve 1005 also touches the support sleeve 750 axially at the contact area 1018c (e.g. due to the shape of the contact area and interaction of the elements thereat). The preload sleeve 1005 typically does not contact the thrust washer 730, which in turn typically does not touch the bearing assembly 410 (e.g. the journal bearing sleeve and/or the bearing bushing assembly). In embodiments, a plurality of rotor preload washers 1010 and disc springs 1015 are installed against the preload sleeve 1005 on the shaft 220 as per FIG. 10B. The disc spring 1015 of FIG. 10B are arranged in series. In some alternate embodiments, the disc springs 1015 can be mounted in parallel or in a combination of parallel and series, which may increase the spring force required for supporting combined weight of a plurality of rotor modules 405 and bearing assemblies 410. The stand-off sleeve 1020 is disposed on the shaft 220 with the disc springs 1015 disposed axially between the stand-off sleeve 1020 and the preload sleeve 1005, and provides the spacing between the last (e.g. bottom and/or proximate) preload washer 1010 and a preloading and locking apparatus in proximity to the end of shaft 220. In this embodiment, the preloading and locking apparatus consists of a locking tab washer 1025 and a threaded lock nut 1030, threaded onto the external threads 220a of the shaft 220. By tightening the lock nut 1030 on the threads 220a of shaft 220, the disc spring stack made from a plurality of disc springs 1015 can become compressed, thus preloading the rotor modules 405 and the support sleeves 750.

This pre-load force can be controlled by setting a designed compression distance 1015a, and this force can be adjusted to support the thrust load from a plurality of rotor modules 405 and bearing assemblies 410 for different rotor assembly 215 lengths. The pre-load force can be calculated such that, in addition to supporting the thrust due to gravity 520, it can also compensate for any thermal growth of the rotor assembly 215 components occurring during transient and/or steady state operation of the motor. In some embodiments, the pre-load force may also prevent magnet separation due to repulsive magnetics forces and/or can be used to overcome large tolerance stack-up for components. Note that due to the proposed stacking method of this embodiment (e.g. steel components on steel shaft), no significant thermal expansion difference is to be expected between these. In some alternate embodiments, the locking apparatus at the end of the shaft 220 can be of a different type, e.g. locking element integral to the nut, snap ring in a snap ring groove with spacer washer(s), or a stand-off spacer secured against the springs on the shaft with a male fastener threaded into a female thread 220b in the center of the shaft end. In embodiments, the preloading mechanism 505 can provide sufficient preload force to compliantly secure the rotor modules on the shaft 220 (e.g. with little to no axial movement).

Figure 10C:
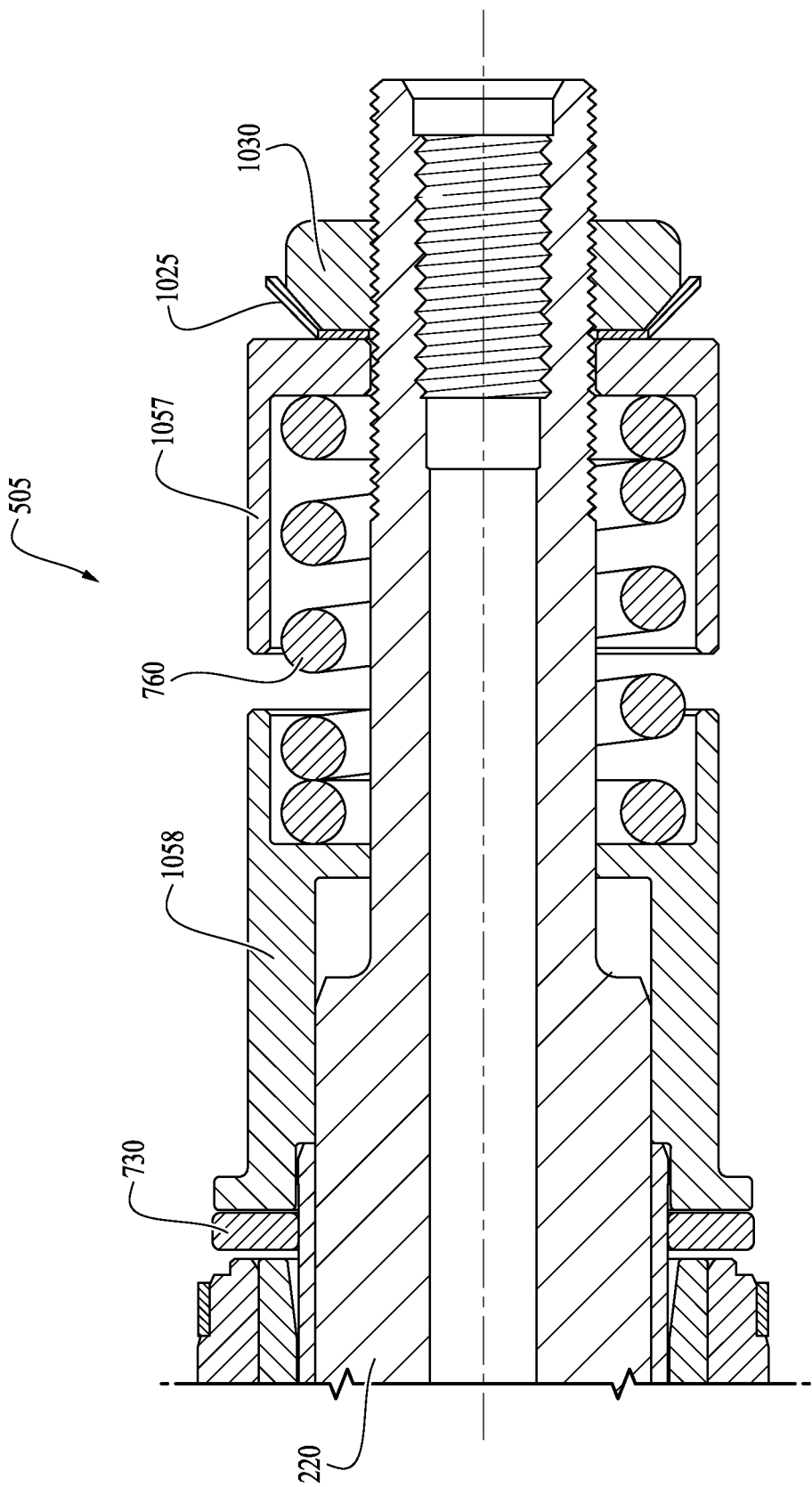
FIG. 10C is an alternate exemplary end embodiment of the rotor assembly of FIG. 8, according to an embodiment.

In an alternate exemplary embodiment, the pre-loading mechanism 505 can use a different spring type (e.g. coil spring 129). See for example, FIG. 10C illustrating an exemplary compression spring 760 used in a similar pre-loading mechanism 505, which may be a coil spring. Alternate embodiments could include a compression spring of a different form (e.g. wave spring), or a custom designed feature that acts as a spring (e.g. slits). Preload sleeve 1058 is of a similar construction of preload sleeve 1005 from FIG. 10B. Comparably, a protective cap 1057 can be used in this embodiment (e.g. instead of a stand-off-sleeve). Both the preload sleeve 1058 and protective cap 1057 are designed to contain at least a portion of the coil spring 760. For increased spring force, the coil spring 760 can be installed in a parallel arrangement (concentric springs) according to another embodiment. In this embodiment, the method of pre-loading of the rotor assembly 215 utilizes the threaded lock nut 1030, although different methods of compressing the spring can be implemented according to other embodiments.

FIG. 11 presents the proposed component stacking method between adjacent rotor modules 405, with a radial hydrodynamic bearing assembly 410 therebetween. The bearing assemblies 410 support the rotor at predefined axial positions to maintain the correct radial alignment of the shaft 220 during the motor operation. These bearings 410 can comprise an inner journal sleeve 770 and an outer bearing bushing assembly 1105, for example with the bearing bushing 1105 configured to be disposed concentrically about the journal sleeve 770. The inner journal sleeve 770 can be secured to the shaft 220 through a support sleeve 750 (which typically may be steel or some other material with CTE similar to the lamination stack 740, the end laminations 745, and/or the drive shaft 220). For example, anti-rotation elements 1120 (e.g. helical springs or elastomeric rings) may rotationally fix the journal sleeve 770 to the support sleeve 750, so that the journal sleeve 770 rotates with the support sleeve 750 (and thereby the shaft 220). The support sleeve 750 is concentrically disposed about the drive shaft 220 (e.g. between two adjacent rotor modules 405) and can be configured to rotate with the shaft 220, while being able to slide axially with respect to the shaft 220. For example, the support sleeve 750 can be keyed to the shaft 220 (e.g. with one or more keys in corresponding longitudinally extending key slots in the shaft, not shown), so as to be allowed to slide along the shaft 220 axially while rotating with the shaft 220. The support sleeve 750 of FIG. 11 has a CTE similar to that of the lamination stack 740, the end lamination 745, and/or the drive shaft 220. For example, all of these components can be formed of steel having similar CTE.

The anti-rotation element's 1120 secondary function can be to axially center the inner journal sleeve 770 between the two adjacent rotor modules 405. The outer bearing bushing assembly 1105 is concentrically located around the journal sleeve 770 and engages into the stator lamination. The engagement into the stator lamination may ensure that the bearing bushing assembly 1105 does not spin during operation. Rather, the bearing bushing assembly 1105 can provide a stationary surface for journal sleeve 770 to rotate in, which may allow it to produce hydrodynamic lubricating film. The support sleeve 750 also can space each rotor module 405 evenly on the shaft 220. The support sleeve 750 in FIG. 11 is configured to provide axial support to the lamination stack 740 of adjacent rotor modules 405 through the end laminations 745, for example touching/abutting the adjacent end lamination 745 on both adjacent magnetic rotor modules 405 (e.g. on either side) at the contact surface 1018b. The adjacent cage rings 725 of the magnetic rotor modules 405 of FIG. 11 are concentrically disposed around the steel support sleeve 750, having a radial clearance 1017b around the steel support sleeve 750. In this embodiment, the thrust washers 730 can be mounted onto the support sleeve 750, on both ends (e.g. with the bearing assembly 410 disposed therebetween). For example, a thrust washer 730 may be disposed between the bearing assembly 410 and the adjacent rotor module 405. In embodiments, the thrust washers 730 can be mounted on the support sleeve 750 by an interference fit method, although other methods of assembly can be implemented. The design of the support sleeve 750 can create defined axial clearances 1016 and 1017a between the thrust washer 730 and the bearing assembly 410 and the cage ring 725 of the magnetic rotor module 405, respectively. Clearance 1016 may allow the thrust washers 730 to not contact the bearing bushing assembly 1105 during the motor operation (e.g. when the rotor assembly 215 is rotating inside the stator assembly 210). Clearance 1017a can be sufficient to accommodate the differential thermal expansion of the cage rings 725 and cage bars 720 in axial direction with respect to the lamination stack 740 of the magnetic rotor module 405.

FIG. 12 illustrates the proposed stacking method of FIG. 8 at a drive end (e.g. at the motor head) of shaft 220. In this embodiment, the mechanical stop for the rotor assembly 215 can be provided by a snap ring arrangement. Other embodiments may include a threaded or interference type of mechanical locking of the rotor assembly 215. The arrangement depicted in FIG. 12 can comprise a snap ring 1205 located in a corresponding groove (e.g. in the exterior of the shaft 220) at a predefined distance from the shaft end on the shaft 220, and a spacer ring 1210 which may be designed to correspond to the profile of the cage ring 725 of the magnetic rotor module 405. The spacer ring 1210 can be installed concentrically with the steel support 750 with a radial clearance 1019c around the steel support sleeve 750. The spacer ring 1210 can touch/abut the support sleeve 750 axially at the contact area 1018a. The compression force generated by the pre-load mechanism 505 of FIG. 8 can be transferred through the rotor assembly 215 at the contact points 1018b between a plurality of steel support sleeves 750 and a plurality of end laminations 745 and lamination stacks 740 of a plurality of adjacent magnetic rotor modules 405, to the spacer ring 1210 through the contact area 1018a, and finally to the shaft 220 through the contact areas 1019a and 1019b between the spacer ring 1210 and the snap ring 1205 and the snap ring 1205 and the shaft 220, respectively.

Figure 13:
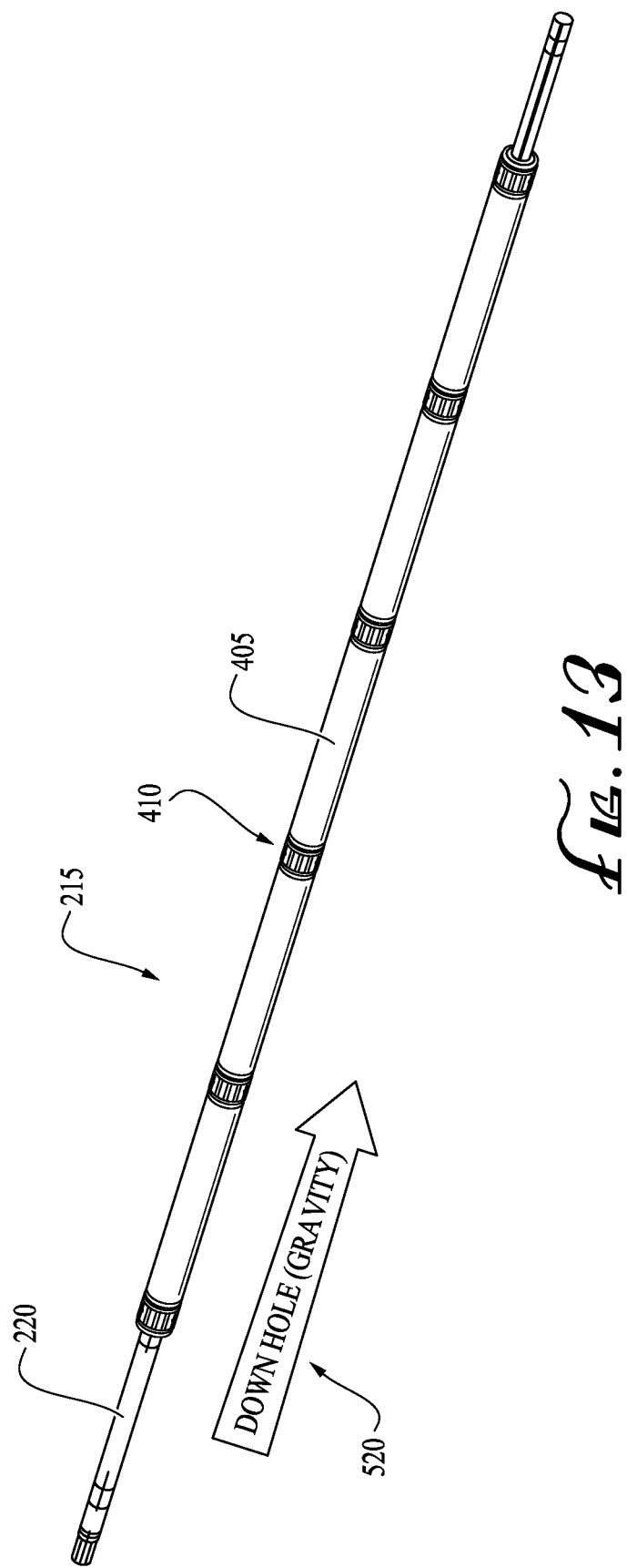
FIG. 13 is an isometric view of another exemplary rotor assembly, according to an embodiment of the disclosure.

An alternate method/system of stacking components of an exemplary rotor assembly 215 is illustrated in FIG. 13. In this embodiment, there is no pre-compression mechanism at the non-drive end (e.g. motor base), nor at the drive end (e.g. motor head) of the rotor assembly 215. Rather, pre-compression can be applied intermediately (e.g. in proximity to one or more rotor modules 405). Typically, intermediate pre-compression can be distributed along the length of the rotor assembly 215, for example at multiple locations spaced approximately evenly. This approach may allow for designs where a step down to a different diameter at either end of the shaft 220 cannot be easily accommodated. It should be understood that while FIG. 13 illustrates an embodiment having only intermediate pre-compression, in alternate embodiments both end and intermediate pre-compression may be used together.

Figure 14:
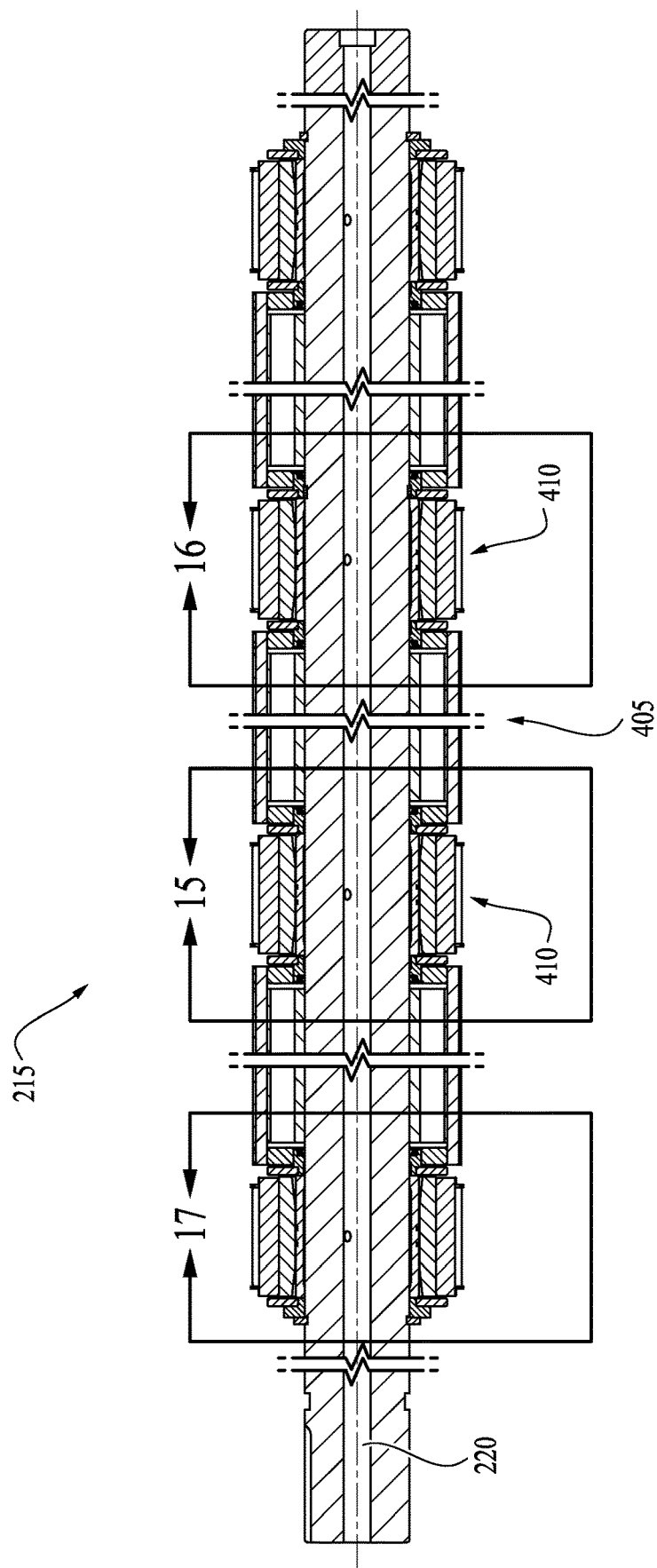
FIG. 14 is an axial cross-section view of the rotor assembly of FIG. 13, according to an embodiment.
Figure 15:
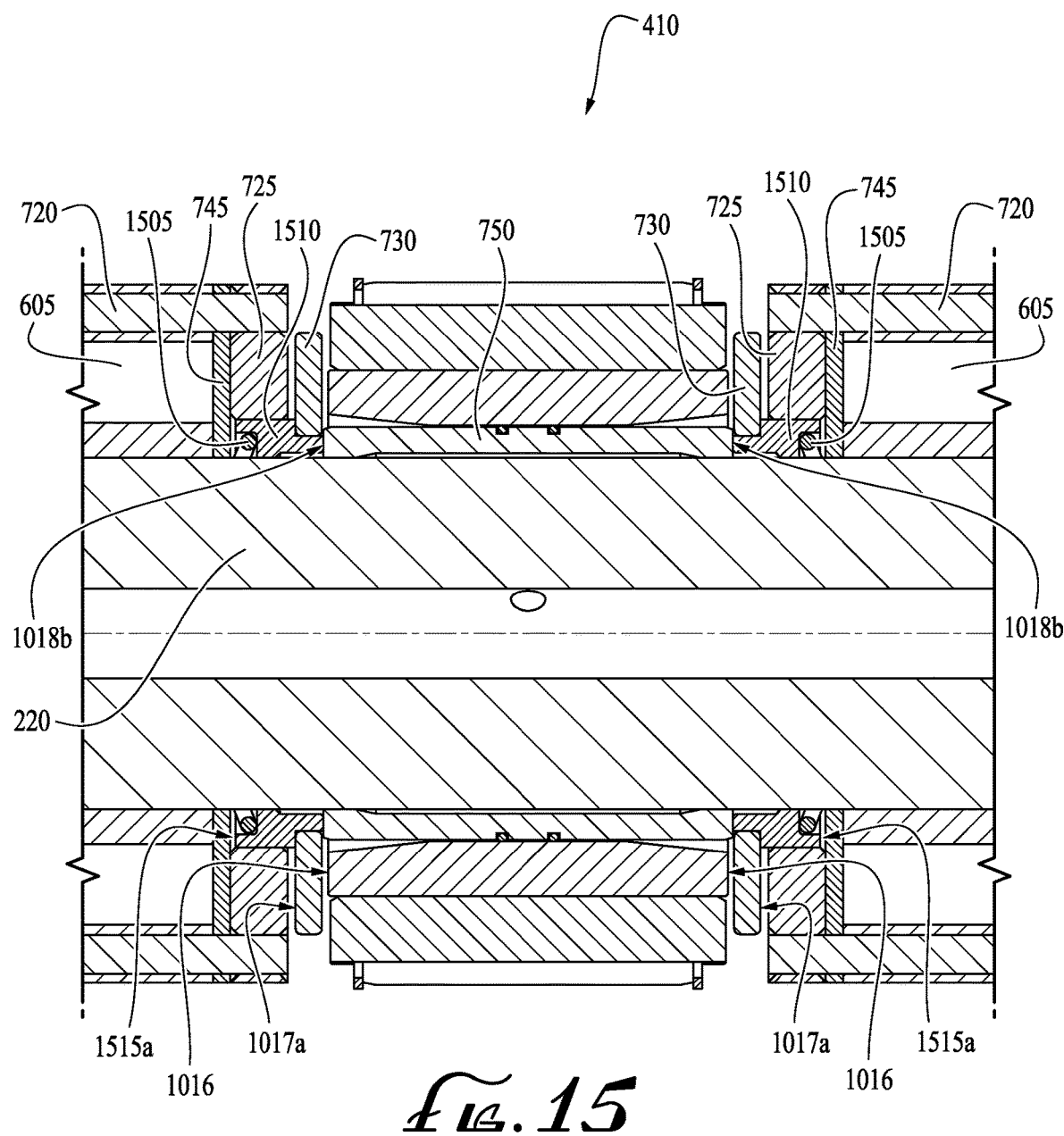
FIG. 15 is an enlarged portion of the axial cross-section view of the rotor assembly of FIG. 14, according to an embodiment of the disclosure.
Figure 16:
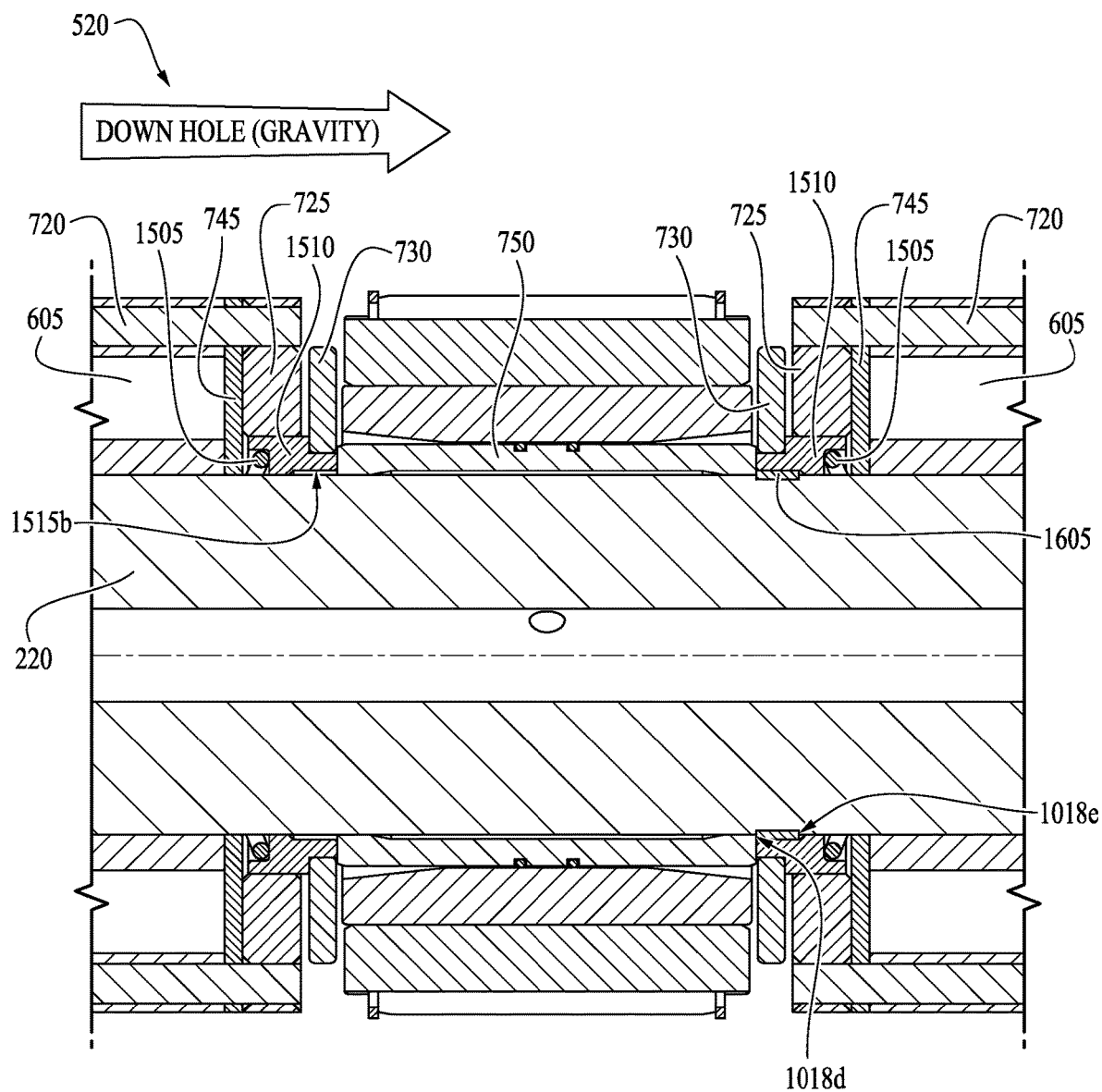
FIG. 16 is an enlarged portion of the axial cross-section view of the rotor assembly of FIG. 14, according to an embodiment of the disclosure.
Figure 17:
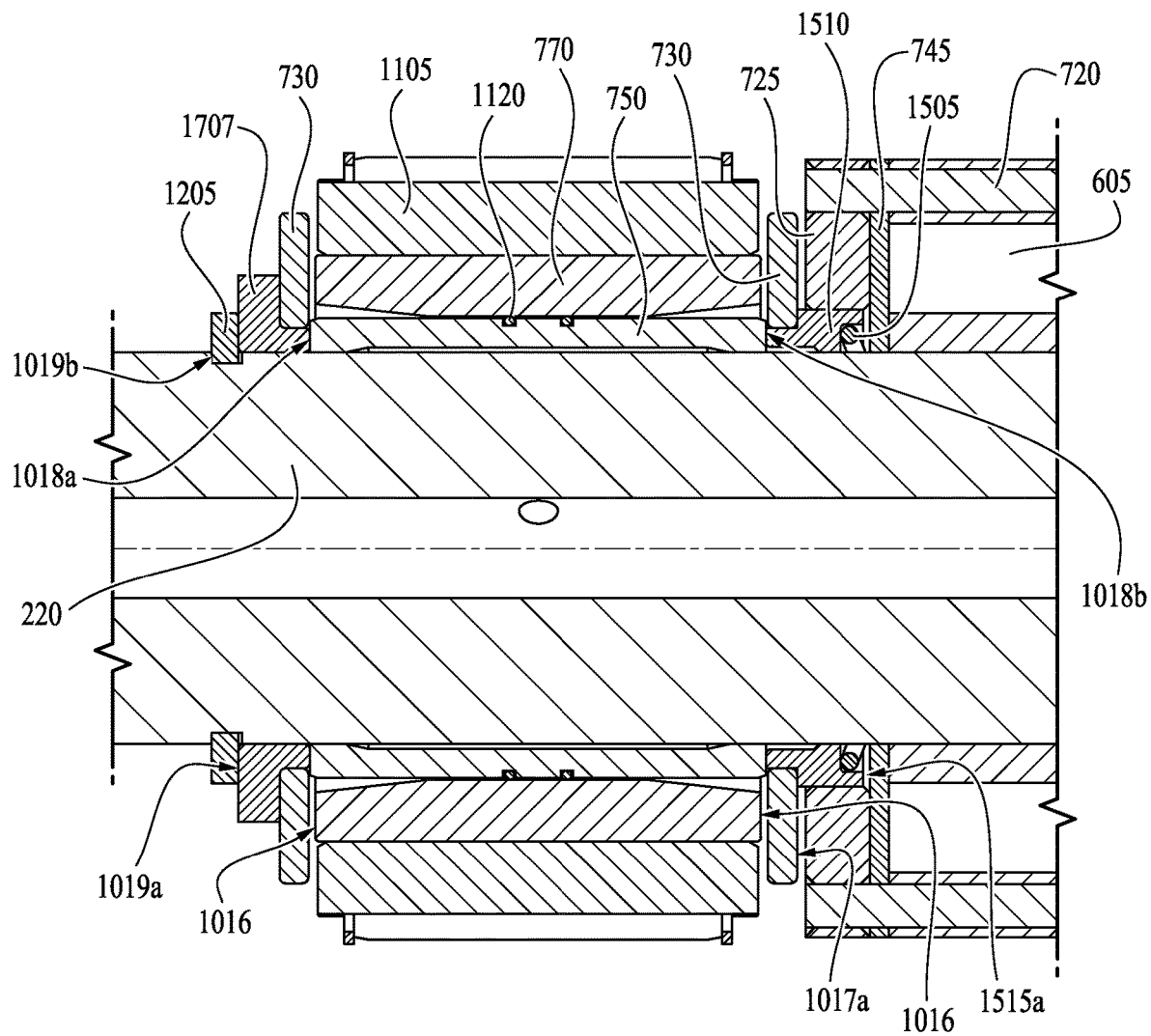
FIG. 17 is an enlarged portion of the axial cross-section view of the rotor assembly of FIG. 14, according to an embodiment of the disclosure.

FIG. 14 illustrates a longitudinal cross-section of an exemplary rotor assembly 215 of this alternate embodiment configured for intermediate pre-compression, showing the overall rotor assembly 215 construction. Detailed views of portions of FIG. 14 are further illustrated in FIGS. 15, 16, and 17. FIG. 17 illustrates an exemplary rotor assembly end locking arrangement, of the sort which can be used at both ends of the shaft 220. FIG. 15 focuses on the proposed stacking method/system between any two adjacent magnetic rotor modules 405 on the shaft 220 (e.g. with bearing assembly 410 disposed therebetween on a support sleeve 750). FIG. 16 details an exemplary method/system of intermediate support for an individual or a plurality (e.g. a grouping) of rotor modules 405 of the shaft 220.

FIG. 15 illustrates a compliant retention system (e.g. which can be configured to apply pre-compression force) created by assembling a set of springs 1505 (e.g. one or more springs) intermediately, for example in proximity to one or more rotor modules 405. For example, the springs 1505 can be disposed axially between the support sleeve 750 and the proximate end lamination 745 of an adjacent rotor module 405. In the embodiment of FIG. 15, the spring(s) 1505 are disposed between a thrust washer support 1510 and the end lamination 745. Due to the stiffness of the spring 1505, a defined axial clearance 1515a is created between the thrust washer support 1510 and the end lamination 745. This gap/axial clearance can be configured to compensate for the thermal expansion of the individual magnetic rotor module 405. The washer support 1510 can contact the steel support sleeve 750 at contact areas 1018b each side of the steel support sleeve 750. The thrust washer 730 can be disposed concentrically around the thrust washer support 1510 (e.g. with the thrust washer support disposed radially between the thrust washer 730 and the drive shaft 220), and can be trapped between the steel support sleeve 750 and the thrust washer support 1510, creating the axial clearances 1016 and 1017a. Clearance 1016 can be configured to ensure the thrust washers 730 do not contact the bearing bushing assembly 1105 during the motor operation (e.g. when rotor assembly 215 is rotating inside the stator assembly 210). The clearance 1017a can be configured to accommodate the differential thermal expansion of the cage rings 725 and cage bars 720 in the axial direction with respect to the steel lamination stack 740 of the magnetic rotor module 405.

The embodiment shown in FIG. 15 has two compliance springs 1505 positioned at each end of the magnetic rotor module 405 and/or in proximity to each end of the support sleeve. However, some embodiments could have one spring per rotor module 405 or one or more spring per group of modules (e.g. 1 spring for every 3 modules). In some embodiments, to get sufficient compliance, more springs 1505 can be used in series at each location. In other embodiments springs 1505 can be used in parallel to increase the load capacity. In alternative embodiments the spring 1505 can be positioned at other interfaces between components, e.g. at interface 1018b. Similarly, additional component divisions can be created, e.g. thrust washer support 1510 could be in two parts with a spring therebetween.

In some embodiments the spring 1505 can be designed to be a feature or portion of (e.g. integral to) the support sleeve 750 and/or thrust washer support 1510, for example by including appropriate features to essentially recreate the "coils" on a spring. In other embodiments the spring 1505 could be a Belleville washer, or similar. Springs 1510 can be coil springs or specialist springs e.g. wave springs, e.g. Smalley's Wavo style.

The spring compliance ability can be set by/based on its stiffness. In embodiments, this compliance can be split among multiple springs 1505 to sum up to the total overall desired compliance. The selected spring 1505 (or combination of springs) should have capacity to achieve a minimum load. The minimum load rating can set an initial spring compression. Adding the additional variation in length from tolerance stack up and thermal growth will set a maximum compression. This maximum compression sets the maximum load applied by the spring. This should not exceed the spring's rating, i.e. maintaining elastic operation of the spring 1505.

Another factor which can be accounted for using spring compliance is gravity 520, particularly when the rotor assembly 215 is orientated in vertical or near vertical direction. Spring 1505 in this orientation can be subjected to the mass of the rotor assembly 215 components supported above one spring 1505 (e.g. a plurality of modules 405 and bearing assemblies 110). Therefore, spring 1505 can carry this gravitational load. Typically, as the magnetic rotor modules 405 get larger and heavier, this may become harder to achieve. As depicted in FIG. 16, an additional intermediate snap ring (or snap rings) 1605 or similar axial support element can be used, for example at regular module divisions (e.g. every multiple magnetic rotor module 405), to act as a physical stop to a certain number of springs 1505. This then limits the amount of mass supported by the springs 1505 above this intermediate snap ring 1605 and prevents an overload of the springs 1505.

The intermediate snap ring 1605 can be positioned between the thrust washer support 1510 and the steel support sleeve 750, for example in a radial cavity 1515b on the thrust washer support 1510, so that the magnetic rotor module 405 can be stopped in both directions axially. The thrust generated by gravity 520 acting on the magnetic rotor modules 405 can be transferred from the steel support sleeve 750 to shaft 220 through the contact areas 1018d and 1018e of the intermediate snap ring 1605, respectively.

In some embodiments, by using a suitable design, the intermediate snap ring 1605 (or end snap ring 1205) can be permanently prevented from coming out of its groove by the steel support sleeve 750 fitted outside it. In other embodiments the intermediate snap ring 1605 can be positioned at any split in the components. Generally, motors are orientated vertically in the same direction down hole 150 for each usage. Therefore, in some embodiments the intermediate snap ring 1605 only has to act to stop the magnetic rotor modules 405 in this one direction, and does not necessarily have to be bi-directional.

FIG. 17 depicts a typical mechanical end stop arrangement, which can be used for this approach. Other embodiments may alternately include a threaded or interference type of mechanical locking of the rotor assembly 215. The arrangement depicted in FIG. 17 consists of a snap ring 1205 located in its groove at predefined distance from the shaft end on shaft 220, and a rotor end thrust washer support 1707. The rotor end thrust washer support 1707 can touch/abut the adjacent support sleeve 750 axially at the contact area 1018a. The compression force generated by preloading a plurality of springs 1505 can be transferred through the rotor assembly 215 at the contact points 1018b between a plurality of steel support sleeves 750, a plurality of thrust washer supports 1510 and a plurality of end laminations 745 and lamination stacks 740 of a plurality of adjacent magnetic rotor modules 405, to the rotor end thrust washer support 1707 through the contact area 1018a, and finally to the shaft 220 through the contact areas 1019a and 1019b between the rotor end thrust washer support 1707 and the snap ring 1205, and the snap ring 1205 and the shaft 220, respectively. At the non-drive end (e.g. motor base) of the shaft 220, the load carried by the snap ring 1205 can increase by the gravitational (thrust) load created by the plurality of magnetic rotor modules 405 and bearing assemblies 410 supported above it, when the rotor assembly 215 is orientated in a vertical or near vertical direction (e.g. the direction of gravity 520). In some embodiment a spring could be added within the interface e.g. at location 1018a. Similarly, component 1707 could be further sub divided into two components with a spring between the two components.

These systems/methods can also be applicable to other motor types, e.g. switch reluctance. These systems/methods can also be applicable to other ESP locations, e.g. pump stage.

So, there may be two disclosed approaches for primarily addressing differential (axial) thermal expansion in the rotor assembly during use (e.g. within an ESP motor), which can result from having materials with different CTE in the rotor assembly. In a first approach, an improved stacking technique can be used to minimize differential thermal expansion within the rotor assembly by removing components with CTE dissimilar to that of the lamination stack and/or drive shaft from an axial stack of supporting components of the rotor assembly. For example, conductive components can be removed from the axial stack of supporting components of the rotor assembly. In embodiments, a support sleeve may be disposed concentrically between the drive shaft and the bearing assembly, with the support sleeve configured to axially support the lamination stack of an adjacent rotor module and with the support sleeve having a CTE similar to that of the lamination stack. The cage rings of the rotor module can be concentrically disposed around the support sleeve with radial clearance therebetween, which may remove the cage rings and cage bars of the rotor module from the axial stack of supporting components.

In a second approach, a biasing element can be used, which is configured to compensate for the differential thermal expansion of the rotor modules with respect to the drive shaft of the rotor assembly (and in some embodiments, also configured to address tolerance stack-up and/or gravity). For example, a preload force can be applied to the rotor assembly via the biasing element, and the preload force can be determined to account for differential axial thermal expansion (and in some embodiments, also tolerance stack-up and/or gravity). In some embodiments, the biasing element can be disposed at the non-drive end of the drive shaft. In other embodiments, the biasing element can include intermediate springs configured for use in proximity to one or more rotor module of the rotor assembly. In still other embodiments, the biasing element can include both.

Furthermore, both the first and second approaches/techniques can be used together (e.g. jointly), for example with the first (e.g. improved component stacking) technique being used to minimize differential thermal expansion, and the second (e.g. pre-compression spring) technique used to address what differential thermal expansion may remain, possibly along with addressing gravitational, magnetic, and/or tolerance stack-up issues.

Additional Disclosure

The following are non-limiting, specific embodiments in accordance with the present disclosure:

In a first embodiment, a rotor assembly for an ESP motor comprises: a first rotor module concentrically disposed on a drive shaft; a second rotor module concentrically disposed on the drive shaft; a support sleeve concentrically disposed on the drive shaft between the first rotor module and the second rotor module; and a bearing assembly concentrically disposed on the support sleeve (e.g. with the support sleeve disposed between the bearing assembly and the drive shaft); wherein each of the first rotor module and the second rotor module comprises: a lamination stack (e.g. concentrically disposed about the drive shaft and typically configured to rotate with the drive shaft), a plurality of cage bars disposed axially within the lamination stack (e.g. within axially extending holes in the lamination stack) and concentrically disposed about the drive shaft (e.g. as a cylindrical cage jointly formed by the cage bars which is concentrically disposed around the drive shaft), and/or a cage ring connected to the plurality of cage bars at each end of the lamination stack (e.g. at opposite axial ends of the lamination stack) and concentrically disposed about the drive shaft; wherein the support sleeve is configured to provide axial support to the lamination stack; wherein the support sleeve has a CTE similar to that of the lamination stack; wherein the CTE of the cage rings and/or the cage bars differs (e.g. is dissimilar from that of the lamination stack (e.g. sufficiently dissimilar to cause significant differential axial thermal expansion of the rotor assembly that can impact ESP motor performance when operating in an ESP pump in a downhole well to pump fluids from a formation to the surface); wherein the support sleeve is configured to rotate with the drive shaft, while being operable to slide axially on the drive shaft; and/or wherein the cage ring at one end of each of the first rotor module and the second rotor module are concentrically disposed around the support sleeve with radial clearance therebetween (e.g. between the adjacent cage rings and the support sleeve).

A second embodiment can include the rotor assembly of the first embodiment, wherein the support sleeve is configured to provide axial space (e.g. sufficient to address differential axial thermal expansion) between the bearing assembly and the (e.g. adjacent) cage ring of the first and second rotor modules.

A third embodiment can include the rotor assembly of the first or second embodiment, wherein the cage bars and/or cage rings have a higher CTE than the lamination stack and support sleeve.

A fourth embodiment can include the rotor assembly of any one of the first to third embodiments, wherein the cage rings and/or cage bars can expand axially when heated to operating temperature without contacting the bearing assembly (e.g. despite the differential thermal expansion of the cage bars and/or cage rings with respect to the lamination stack).

A fifth embodiment can include the rotor assembly of any one of the first to fourth embodiments, wherein each of the first rotor module and the second rotor module further comprises end laminations at each end of the lamination stack, and the support sleeve abuts an adjacent one of the end laminations of both the first rotor module and the second rotor module (e.g. so that the support sleeve provides axial spacing between the rotor modules that can expand at elevated temperatures similarly to the lamination stack, which may help to maintain approximately the spacing therebetween).

A sixth embodiment can comprise the rotor assembly of any one of the first to fifth embodiments, further comprising two thrust washers mounted onto (e.g. by interference fit) the support sleeve, wherein the bearing assembly is disposed between the two thrust washers, and wherein a first of the two thrust washers is adjacent the first rotor module and a second of the two thrust washers is adjacent the second rotor module.

A seventh embodiment can comprise the rotor assembly of the sixth embodiment, wherein there is axial clearance between each of the two thrust washers and the bearing assembly.

An eighth embodiment can comprise the rotor assembly of any one of the sixth to seventh embodiments, wherein there is axial clearance between an adjacent one of the cage rings of the first rotor module and the first thrust washer; and there is axial clearance between the second thrust washer and an adjacent one of the cage rings of the second rotor module.

A ninth embodiment can comprise the rotor assembly of the eighth embodiment, wherein axial clearance (e.g. between the two thrust washers and the bearing assembly and/or between the cage ring and the adjacent thrust washer) is configured (e.g. determined and pre-set) to accommodate differential thermal expansion of the cage ring and/or cage bars axially with respect to the lamination stack, support sleeve, bearing assembly, and/or drive shaft.

A tenth embodiment can comprise the rotor assembly of any one of the first to ninth embodiments, wherein the lamination stack (e.g. including lamination ends) and the support sleeve are formed of steel, while the cage rings and/or cage bars are not formed of steel (e.g. formed of copper, aluminum, brass, and/or some other conductive material with different/dissimilar CTE than steel).

In eleventh embodiment can comprise the rotor assembly of any one of the first to tenth embodiments, wherein the support sleeve is keyed (e.g. with projecting key extending radially into corresponding keyway in the drive shaft, which is longer than the key) to the drive shaft to allow axial sliding as the support sleeve rotates with the drive shaft.

A twelfth embodiment can comprise the rotor assembly of any one of the first to eleventh embodiments, wherein the bearing assembly comprises a journal sleeve which is secured to the support sleeve to rotate with the drive shaft.

A thirteenth embodiment can comprise the rotor assembly of the twelfth embodiment, wherein the journal sleeve is secured to the support sleeve by one or more anti-rotation elements (e.g. helical springs or elastomeric rings).

A fourteenth embodiment can comprise the rotor assembly of any one of the fifth to thirteenth embodiments, wherein each of the rotor modules further comprises one or more magnets concentrically disposed about the drive shaft and axially disposed between the two end laminations.

A fifteenth embodiment can comprise the rotor assembly of any one of the first to fourteenth embodiments, further comprising one or more biasing element configured to compensate for differential (e.g. axial) thermal expansion of the rotor modules relative to the drive shaft (and in some embodiment the weight of the rotor assembly and/or tolerance stack-up).

A sixteenth embodiment can comprise the rotor assembly of the fifteenth embodiment, wherein the biasing element comprises a preload assembly disposed at a non-drive end of the drive shaft.

A seventeenth embodiment can comprise the rotor assembly of the sixteenth embodiment, wherein the preload assembly comprises one or more springs and a preloading and locking apparatus operable to fix/lock the one or more spring under compression (e.g. to provide a preload force configured to compensate for thermal growth of the rotor assembly and/or gravity).

An eighteenth embodiment can comprise the rotor assembly of the seventeenth embodiment, wherein the preloading and locking apparatus is operable to allow for adjustment of the preload force/compression of the one or more springs.

A nineteenth embodiment can comprise the rotor assembly of any one of the seventeenth to eighteenth embodiments, wherein the preloading and locking apparatus comprises a locking nut which is threadable onto the non-drive end of the drive shaft.

A twentieth embodiment can comprise the rotor assembly of any one of the seventeenth to nineteenth embodiments, wherein the springs are disc springs or compression springs (e.g. coil, wave, etc.).

A twenty-first embodiment can comprise the rotor assembly of the fifteenth embodiment, wherein the biasing element comprises a spring disposed between the support sleeve and one of the end laminations (e.g. the adjacent end lamination) of at least one of the first rotor module and the second rotor module, wherein the spring is configured to create axial clearance therebetween (e.g. between the support sleeve and the adjacent end lamination).

A twenty-second embodiment can comprise the rotor assembly of the twenty-first embodiment, further comprising a thrust washer support disposed concentrically about the drive shaft and axially between the support sleeve and one of the end laminations (e.g. the adjacent end lamination) of at least one of the first rotor module and the second rotor module, wherein the thrust washer support abuts (e.g. contacts) the support sleeve, and wherein the spring is disposed axially between the thrust washer support and one of the end laminations (e.g. the adjacent end lamination) of at least one of the first rotor module and the second rotor module (e.g. creating axial clearance).

A twenty-third embodiment can comprise the rotor assembly of the twenty-second embodiment, wherein one of the two thrust washers is disposed axially between the steel support sleeve and the thrust washer support.

A twenty-fourth embodiment can comprise the rotor assembly of the twenty-third embodiment, wherein the thrust washer support comprises a recess for the spring at an axial end adjacent the (adjacent) end lamination, and wherein the thrust washer support comprises a recess for the thrust washer at an axial end adjacent the support sleeve (e.g. at an exterior surface of the thrust washer support).

A twenty-fifth embodiment can comprise the rotor assembly of any one of the twenty-first to twenty-fourth embodiments, further comprising a snap ring disposed on the drive shaft and configured to act as a physical stop for axial movement of the spring.

A twenty-sixth embodiment can comprise the rotor assembly of the twenty-fifth embodiment, wherein the snap ring is disposed between the thrust washer support and the support sleeve (e.g. disposed in a radial cavity on the interior surface of the thrust washer support).

In a twenty-seventh embodiment, a rotor assembly for an ESP motor comprises: a first rotor module concentrically disposed on a drive shaft; a second rotor module concentrically disposed on the drive shaft; a bearing assembly concentrically disposed on the drive shaft between the first rotor module and the second rotor module; and one or more biasing element configured to compensate for differential (e.g. axial) thermal expansion of the rotor modules relative to the drive shaft and/or weight of the rotor assembly.

A twenty-eighth embodiment can include the rotor assembly of the twenty-seventh embodiment, wherein the biasing element is preloaded with a preload force selected based on weight supported, tolerance stack-up, and/or thermal growth.

A twenty-ninth embodiment can comprise the rotor assembly of any one of the twenty-seventh to twenty-eighth embodiments, wherein the biasing element comprises a preload assembly disposed at a non-drive end of the drive shaft.

A thirtieth embodiment can comprise the rotor assembly of the twenty-ninth embodiment, wherein the preload assembly comprises one or more springs and a preloading and locking apparatus operable to fix/lock the one or more spring under compression (e.g. to provide a preload force configured to compensate for thermal growth of the rotor assembly and/or gravity).

A thirty-first embodiment can comprise the rotor assembly of the thirtieth embodiment, wherein the preloading and locking apparatus is operable to allow for adjustment of the preload force (e.g. amount of compression of the one or more springs).

A thirty-second embodiment can comprise the rotor assembly of any one of the thirtieth to thirty-first embodiments, wherein the preloading and locking apparatus comprises a locking nut which is threadable onto the non-drive end of the drive shaft.

A thirty-third embodiment can comprise the rotor assembly of any one of the thirtieth to thirty-second embodiments, wherein the one or more springs are disc springs or compression springs (e.g. coil, wave, etc.).

A thirty-fourth embodiment can comprise the rotor assembly of any one of the twenty-seventh to twenty-eighth embodiments, wherein the biasing element comprises one or more spring axially disposed between the bearing assembly and one or both of the first rotor module and the second rotor module.

A thirty-fifth embodiment can comprise the rotor assembly of the thirty-third embodiment, wherein the biasing element further comprising a support sleeve concentrically disposed on the drive shaft between the first rotor module and the second rotor module; wherein the support sleeve is configured to rotate with the drive shaft, while being operable to slide axially on the drive shaft; wherein the bearing assembly is concentrically disposed on the support sleeve; wherein each of the first rotor module and the second rotor module comprises: a lamination stack concentrically disposed about the drive shaft, end laminations at each end of the lamination stack, a plurality of cage bars disposed axially within the lamination stack and concentrically disposed about the drive shaft, and a cage ring connected to the plurality of cage bars at each end of the lamination stack and concentrically disposed about the drive shaft; wherein the support sleeve is configured to provide axial support to the lamination stack; wherein the support sleeve has a CTE similar to that of the lamination stack; wherein the CTE of the cage rings and/or the cage bars differs/is dissimilar from that of the lamination stack; wherein the support sleeve is axially adjacent to the end lamination at one end (e.g. adjacent end) of both the first rotor module and the second rotor module; and wherein the one or more spring is disposed between the support sleeve and one of the end laminations (e.g. the adjacent end lamination) of at least one of the first rotor module and the second rotor module, wherein the spring is configured to create axial clearance therebetween (e.g. between the support sleeve and the adjacent end lamination).

A thirty-sixth embodiment can comprise the rotor assembly of the thirty-fifth embodiment, further comprising two thrust washers mounted onto (e.g. by interference fit) the support sleeve, wherein the bearing assembly is disposed between the two thrust washers, and wherein a first of the two thrust washers is adjacent the first rotor module and a second of the two thrust washers is adjacent the second rotor module; the rotor assembly further comprising a thrust washer support disposed concentrically about the drive shaft and axially between the support sleeve and one of the end laminations (e.g. the adjacent end lamination) of at least one of the first rotor module and the second rotor module, wherein the thrust washer support abuts the support sleeve, and wherein one or more springs (e.g. a set of springs) is disposed axially between the thrust washer support and one of the end laminations (e.g. the adjacent end lamination) of at least one of the first rotor module and the second rotor module.

A thirty-seventh embodiment can comprise the rotor assembly of the thirty-sixth embodiment, wherein the thrust washer support comprises a recess for the one or more spring at an axial end adjacent the (adjacent) end lamination.

A thirty-eighth embodiment can comprise the rotor assembly of any one of the thirty-sixth to thirty-seventh embodiments, wherein the thrust washer support comprises a recess for the thrust washer at an axial end adjacent the support sleeve (and at an exterior surface).

A thirty-ninth embodiment can comprise the rotor assembly of any one of the thirty-fourth to thirty-eighth embodiments, further comprising a snap ring disposed on the drive shaft and configured to act as a physical stop for axial movement of the one or more spring.

A fortieth embodiment can comprise the rotor assembly of the thirty-ninth embodiment, wherein the snap ring is disposed between the thrust washer support and the support sleeve (e.g. disposed in a radial cavity on the interior surface of the thrust washer support).

In a forty-first embodiment, a method for assembling a rotor assembly for an ESP motor comprises: providing the rotor assembly with an axial biasing element; determining a preload force for the rotor assembly to accommodate tolerance stack-up and/or differential (e.g. axial) thermal expansion within the rotor assembly, for example based on CTE difference (e.g. between the drive shaft and the conductive elements of the rotor modules); and compressing the biasing element to provide the preload force.

A forty-second embodiment can include the method of the forty-first embodiment, wherein determining the preload force is further based on weight of the rotor assembly supported.

A forty-third embodiment can include the method of any one of the forty-first to forty-second embodiments, wherein the biasing element comprises: a preload assembly disposed at a non-drive end of a drive shaft which comprises one or more springs and a preloading and locking apparatus operable to fix the one or more spring under compression (e.g. to provide a preload force configured to compensate for thermal growth of the rotor assembly, tolerance stack-up, and/or gravity).

A forty-fourth embodiment can include the method of the forty-third embodiment, wherein the preloading and locking apparatus comprises a locking nut which is threadable onto the non-drive end of the drive shaft; and wherein compressing the biasing element comprises rotating the threaded locking nut to provide the preload force, wherein the locking nut then fixes the amount of compression.

A forty-fifth embodiment can include the method of any one of the forty-first to forty-second embodiments, wherein the biasing element comprises: a spring disposed between a support sleeve and an end lamination of a rotor module, configured to create axial clearance therebetween; and a mechanical end stop; wherein compressing the biasing element comprises compressing the spring and locking the mechanical end stop to fix the preload force.

A forty-sixth embodiment can include the method of the forty-fifth embodiment, further comprising installing a snap ring onto the drive shaft which is configured to act as a physical stop for the spring (e.g. limiting the amount of mass supported by the spring to prevent overload of the spring).

A forty-seventh embodiment can include the method of any one of the forty-first to forty-sixth embodiments, further comprising minimizing the differential (e.g. axial) thermal expansion within the rotor assembly.

A forty-eighth embodiment can include the method of the forty-seventh embodiment, wherein minimizing the differential thermal expansion comprises removing components of the rotor assembly having a dissimilar CTE from the lamination stack, end lamination, and/or drive shaft (e.g. conductive components) from an axial stack of supporting components of the rotor assembly.

A forty-ninth embodiment can include the method the forty-eighth embodiment, wherein removing components of the rotor assembly having a dissimilar CTE comprises disposing a bearing assembly concentrically on a support sleeve, wherein the support sleeve is configured to rotate with the drive shaft and wherein the support sleeve provides axial support to a lamination stack of a rotor module adjacent to the bearing assembly.

A fiftieth embodiment can include the method of the forty-ninth embodiment, wherein removing components of the rotor assembly having a dissimilar CTE further comprises selecting the support sleeve to have a similar CTE to the lamination stack, and wherein the components of the rotor assembly having a dissimilar CTE comprise a plurality of cage bars and cage rings having a different/dissimilar (e.g. higher) CTE than the lamination stack of a rotor module.

A fifty-first embodiment can include the method of the fiftieth embodiment, wherein an adjacent one of the cage rings for the rotor module is concentrically disposed around the support sleeve with radial clearance therebetween.

A fifty-second embodiment can include the method of any one of the forty-first to fifty-first embodiment, further comprising: assembling the ESP motor with the rotor assembly (e.g. of any one of the first to fortieth embodiments) therein; assembling an ESP assembly comprising the ESP motor coupled to an ESP pump; inserting/placing the ESP assembly downhole in a wellbore; pumping formation fluids from the wellbore to the surface using the ESP assembly.

In a fifty-third embodiment, a method for assembling a rotor assembly for an ESP motor comprises: disposing a first rotor module concentrically on a drive shaft; disposing a second rotor module concentrically on the drive shaft; disposing a support sleeve concentrically on the drive shaft between the first and second rotor modules; disposing a bearing assembly concentrically on the support sleeve (e.g. with the support sleeve disposed between the bearing assembly and the drive shaft); wherein each of the first rotor module and the second rotor module comprises: a lamination stack concentrically disposed about the drive shaft, a plurality of cage bars disposed axially within the lamination stack and concentrically disposed about the drive shaft, and a cage ring connected to the plurality of cage bars at each end of the lamination stack and concentrically disposed about the drive shaft; wherein the support sleeve is configured to provide axial support to the lamination stack; wherein the support sleeve has a CTE similar to that of the lamination stack; wherein the CTE of the cage rings and/or the cage bars differs/is dissimilar from that of the lamination stack; wherein the support sleeve is configured to rotate with the drive shaft, while being operable to slide axially on the drive shaft; and wherein the cage ring at one end of each of the first rotor module and the second rotor module are concentrically disposed around the support sleeve with radial clearance therebetween.

A fifty-fourth embodiment can include the method of the fifty-third embodiment, further comprising determining a preload force for the rotor assembly to accommodate differential thermal expansion within the rotor assembly; and providing the preload force on the rotor assembly.

A fifty-fifth embodiment can include the method of the fifty-fourth embodiment, wherein the preload force is applied using a preload assembly disposed at a non-drive end of a drive shaft which comprises one or more springs and a preloading and locking apparatus operable to fix the one or more spring under compression.

A fifty-sixth embodiment can include the method of the fifty-fourth embodiment, wherein the preload force is applied by compressing a spring axially disposed between the support sleeve and an end lamination of a rotor module.

A fifty-seventh embodiment can include the method of the fifty-sixth embodiment, further comprising disposing an intermediate snap ring on the drive shaft axially between the support sleeve and the end lamination, wherein the intermediate snap ring is configured to act as a physical stop to prevent overloading of the spring A fifty-eighth embodiment can include the method of any one of the fifty-third to fifty-seventh embodiments, further comprising: assembling the ESP motor with the rotor assembly (e.g. of any one of the first to fortieth embodiments) therein; assembling an ESP assembly comprising the ESP motor coupled to an ESP pump; inserting/placing the ESP assembly downhole in a wellbore; pumping formation fluids from the wellbore to the surface using the ESP assembly.

In a fifty-ninth embodiment, an ESP assembly can comprise an electric motor coupled to a pump, with the rotor assembly of any the first to fortieth embodiments being in the motor (e.g. disposed within a stator and configured to allow for rotation of the drive shaft to power the pump).

In a sixtieth embodiment, a method can include placement of the ESP assembly of the fifty-ninth embodiment in a wellbore, and operation of the ESP assembly to pump formation fluids from the wellbore to the surface.

While embodiments have been shown and described, modifications thereof can be made by one skilled in the art without departing from the spirit and teachings of this disclosure. The embodiments described herein are exemplary only and are not intended to be limiting. Many variations and modifications of the embodiments disclosed herein are possible and are within the scope of this disclosure. For example, the various elements or components may be combined or integrated in another system or certain features may be omitted or not implemented. Also, techniques, systems, subsystems, and methods described and illustrated in the various embodiments as discrete or separate may be combined or integrated with other techniques, systems, subsystems, or methods without departing from the scope of this disclosure. Other items shown or discussed as directly coupled or connected or communicating with each other may be indirectly coupled, connected, or communicated with. Method or process steps set forth may be performed in a different order. The use of terms, such as "first," "second," "third" or "fourth" to describe various processes or structures is only used as a shorthand reference to such steps/structures and does not necessarily imply that such steps/structures are performed/formed in that ordered sequence (unless such requirement is clearly stated explicitly in the specification).

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . 95 percent, 96 percent, 97 percent, 98 percent, 99 percent, or 100 percent. Moreover, any numerical range defined by two R numbers as defined in the above is also specifically disclosed. Language of degree used herein, such as "approximately," "about," "generally," and "substantially," represent a value, amount, or characteristic close to the stated value, amount, or characteristic that still performs a desired function or achieves a desired result. For example, the language of degree may mean a range of values as understood by a person of skill or, otherwise, an amount that is +/−10%.

Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded. The use of the terms such as "high-pressure" and "low-pressure" is intended to only be descriptive of the component and their position within the systems disclosed herein. That is, the use of such terms should not be understood to imply that there is a specific operating pressure or pressure rating for such components. For example, the term "high-pressure" describing a manifold should be understood to refer to a manifold that receives pressurized fluid that has been discharged from a pump irrespective of the actual pressure of the fluid as it leaves the pump or enters the manifold. Similarly, the term "low-pressure" describing a manifold should be understood to refer to a manifold that receives fluid and supplies that fluid to the suction side of the pump irrespective of the actual pressure of the fluid within the low-pressure manifold.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

As used herein, the term "and/or" includes any combination of the elements associated with the "and/or" term. Thus, the phrase "A, B, and/or C" includes any of A alone, B alone, C alone, A and B together, B and C together, A and C together, or A, B, and C together.

What is claimed is:

1. A rotor assembly for an ESP motor, comprising:
   a first rotor module concentrically disposed on a drive shaft;
   a second rotor module concentrically disposed on the drive shaft;
   a support sleeve concentrically disposed on the drive shaft between the first rotor module and the second rotor module; and
   a bearing assembly concentrically disposed on the support sleeve;
   wherein:
   each of the first rotor module and the second rotor module comprises:
     a lamination stack concentrically disposed about the drive shaft,
     a plurality of cage bars disposed axially within the lamination stack and concentrically disposed about the drive shaft, and
     a cage ring connected to the plurality of cage bars at each end of the lamination stack and concentrically disposed about the drive shaft;
   the support sleeve is configured to provide axial support to the lamination stack;
   the support sleeve has a CTE similar to that of the lamination stack;
   the CTE of the cage rings and the cage bars is dissimilar from that of the lamination stack;
   the support sleeve is configured to rotate with the drive shaft, while being operable to slide axially on the drive shaft; and
   the cage ring at one end of each of the first rotor module and the second rotor module are concentrically disposed around the support sleeve with radial clearance therebetween;
   further comprising two thrust washers mounted onto the support sleeve, wherein the bearing assembly is disposed between the two thrust washers, and wherein a first of the two thrust washers is adjacent the first rotor module and a second of the two thrust washers is adjacent the second rotor module;
   wherein:
   there is axial clearance between each of the two thrust washers and the bearing assembly;
   there is axial clearance between an adjacent one of the cage rings of the first rotor module and the first thrust washer;
   there is axial clearance between the second thrust washer and an adjacent one of the cage rings of the second rotor module; and
   each of the two thrust washers extends radially outward between the bearing assembly and the adjacent cage ring and is axially disposed between the bearing assembly and the adjacent cage ring.

2. The rotor assembly of claim 1, wherein each of the first rotor module and the second rotor module further comprises end laminations at each end of the lamination stack, and the support sleeve abuts an adjacent one of the end laminations of both the first rotor module and the second rotor module.

3. The rotor assembly of claim 1, wherein the lamination stack is formed of steel, the support sleeve is formed of steel, and the cage rings and cage bars are formed of copper, aluminum, or brass.

4. The rotor assembly of claim 1, wherein the bearing assembly comprises a journal sleeve which is secured to the support sleeve to rotate with the drive shaft, and wherein the journal sleeve is secured to the support sleeve by one or more anti-rotation elements.

5. The rotor assembly of claim 1, further comprising one or more biasing element configured to compensate for at least differential axial thermal expansion of the rotor modules relative to the drive shaft.

6. The rotor assembly of claim 5, wherein the biasing element comprises a preload assembly disposed at a non-drive end of the drive shaft.

7. The rotor assembly of claim 5, wherein:
   each of the first rotor module and the second rotor module further comprises end laminations at each end of the lamination stack; and
   the biasing element comprises a spring disposed between the support sleeve and an adjacent one of the end laminations of at least one of the first rotor module and the second rotor module, which is configured to create axial clearance therebetween.

8. A rotor assembly for an ESP motor, comprising:
   a first rotor module concentrically disposed on a drive shaft;
   a second rotor module concentrically disposed on the drive shaft;

a support sleeve concentrically disposed on the drive shaft between the first rotor module and the second rotor module; and
a bearing assembly concentrically disposed on the support sleeve;
wherein:
each of the first rotor module and the second rotor module comprises:
a lamination stack concentrically disposed about the drive shaft,
a plurality of cage bars disposed axially within the lamination stack and concentrically disposed about the drive shaft, and
a cage ring connected to the plurality of cage bars at each end of the lamination stack and concentrically disposed about the drive shaft;
the support sleeve is configured to provide axial support to the lamination stack;
the support sleeve has a CTE similar to that of the lamination stack;
the CTE of the cage rings and the cage bars is dissimilar from that of the lamination stack;
the support sleeve is configured to rotate with the drive shaft, while being operable to slide axially on the drive shaft; and
the cage ring at one end of each of the first rotor module and the second rotor module are concentrically disposed around the support sleeve with radial clearance therebetween;
further comprising one or more biasing element configured to compensate for at least differential axial thermal expansion of the rotor modules relative to the drive shaft,
wherein:
each of the first rotor module and the second rotor module further comprises end laminations at each end of the lamination stack; and
the biasing element comprises a spring disposed between the support sleeve and an adjacent one of the end laminations of at least one of the first rotor module and the second rotor module, which is configured to create axial clearance therebetween; further comprising:
two thrust washers mounted onto the support sleeve, wherein the bearing assembly is disposed between the two thrust washers, and wherein a first of the two thrust washers is adjacent the first rotor module and a second of the two thrust washers is adjacent the second rotor module; and
a thrust washer support disposed concentrically about the drive shaft and axially between the support sleeve and an adjacent one of the end laminations of at least one of the first rotor module and the second rotor module;
wherein:
the thrust washer support abuts the support sleeve,
the spring is disposed axially between the thrust washer support and an adjacent one of the end laminations of at least one of the first rotor module and the second rotor module, and
one of the two thrust washers is disposed axially between the steel support sleeve and the thrust washer support.

9. The rotor assembly of claim 7, further comprising a snap ring disposed on the drive shaft and configured to act as a physical stop for axial movement of the spring.

10. A rotor assembly for an ESP motor, comprising:
a first rotor module concentrically disposed on a drive shaft and comprising a cage ring and a lamination stack;
a second rotor module concentrically disposed on the drive shaft and comprising a cage ring and a lamination stack;
a bearing assembly concentrically disposed on the drive shaft between the first rotor module and the second rotor module;
a support sleeve concentrically disposed on the drive shaft between the first rotor module and the second rotor module, wherein the support sleeve is configured to rotate with the drive shaft, while being operable to slide axially on the drive shaft, and the bearing assembly is concentrically disposed on the support sleeve;
a thrust washer, wherein the thrust washer is disposed concentrically about the drive shaft, extends radially outward between the bearing assembly and the cage ring of an adjacent one of the first or second rotor modules, and is disposed axially therebetween; and
a biasing element configured to compensate for tolerance stack-up and differential axial thermal expansion of the rotor modules relative to the drive shaft;
wherein:
the support sleeve has a CTE similar to that of the lamination stack;
the CTE of the cage rings is dissimilar from that of the lamination stack;
the cage ring at one end of each of the first rotor module and the second rotor module are concentrically disposed around the support sleeve with radial clearance therebetween;
there is axial clearance between the thrust washer and the bearing assembly; and
the bearing assembly comprises a journal sleeve which is secured to the support sleeve to rotate with the drive shaft.

11. The rotor assembly of claim 10, wherein the biasing element is preloaded with a preload force selected based on weight supported, tolerance stack-up, and thermal growth.

12. The rotor assembly of claim 10, wherein the biasing element comprises a preload assembly disposed at a non-drive end of the drive shaft.

13. The rotor assembly of claim 10, wherein the biasing element comprises one or more spring axially disposed between the bearing assembly and one or both of the first rotor module and the second rotor module.

14. The rotor assembly of claim 10, further comprising a second thrust washer disposed centrically about the drive shaft, wherein:
the two thrust washers are mounted onto the support sleeve; and
the bearing assembly is disposed between the two thrust washers.

15. The rotor assembly of claim 14, wherein there is axial clearance between each of the two thrust washer and the cage ring of the adjacent rotor module.

16. The rotor assembly of claim 10, further comprising a thrust washer support disposed concentrically about the drive shaft and axially between the support sleeve and the adjacent rotor module, wherein the thrust washer is mounted on the corresponding thrust washer support.

17. The rotor assembly of claim 16, wherein there is axial clearance between the thrust washer and the adjacent cage ring.

18. The rotor assembly of claim 16, wherein:
the biasing element comprises a spring axially disposed between the thrust washer support and the adjacent rotor module; and
the thrust washer support abuts the support sleeve.

19. The rotor assembly of claim 16, wherein the biasing element comprises a spring axially disposed between the bearing assembly and the adjacent rotor module.

20. The rotor assembly of claim 19, wherein the thrust washer support comprises a recess for the spring, and wherein the thrust washer support comprises a recess for the thrust washer.

* * * * *